(12) United States Patent
Raghavan et al.

(10) Patent No.: US 11,870,521 B2
(45) Date of Patent: Jan. 9, 2024

(54) UE BASED DETERMINATION OF INTER-BAND CARRIER AGGREGATION MODES

(71) Applicant: QUALCOMM Incorporated, San Diego, CA (US)

(72) Inventors: Vasanthan Raghavan, West Windsor Township, NJ (US); Tao Luo, San Diego, CA (US); Junyi Li, Fairless Hills, PA (US)

(73) Assignee: QUALCOMM Incorporated, San Diego, CA (US)

( * ) Notice: Subject to any disclaimer, the term of this patent is extended or adjusted under 35 U.S.C. 154(b) by 155 days.

(21) Appl. No.: 17/323,744

(22) Filed: May 18, 2021

(65) Prior Publication Data

US 2021/0391902 A1  Dec. 16, 2021

Related U.S. Application Data

(60) Provisional application No. 63/038,506, filed on Jun. 12, 2020.

(51) Int. Cl.
*H04B 7/06* (2006.01)
*H04W 76/10* (2018.01)
*H04W 72/0453* (2023.01)

(52) U.S. Cl.
CPC ...... *H04B 7/0617* (2013.01); *H04W 72/0453* (2013.01); *H04W 76/10* (2018.02)

(58) Field of Classification Search
CPC .... H04B 7/0617; H04B 7/0695; H04B 7/063; H04B 7/088; H04W 72/0453; H04W 76/10; H04W 24/08; H04W 36/0069; H04L 5/001
See application file for complete search history.

(56) References Cited

U.S. PATENT DOCUMENTS

| | | | |
|---|---|---|---|
| 2011/0026495 A1* | 2/2011 | Lee | H04L 1/188 370/335 |
| 2013/0115997 A1* | 5/2013 | Immonen | H04W 52/367 455/522 |
| 2016/0262144 A1* | 9/2016 | Kitazoe | H04L 5/0057 |
| 2016/0337916 A1* | 11/2016 | Deenoo | H04W 36/0094 |

(Continued)

FOREIGN PATENT DOCUMENTS

WO   WO-2020032569 A1   2/2020

OTHER PUBLICATIONS

International Search Report and Written Opinion—PCT/US2021/033266—ISA/EPO—dated Oct. 25, 2021 2021 (203608WO).

(Continued)

*Primary Examiner* — Michael K Phillips
(74) *Attorney, Agent, or Firm* — Sevan Savsa; Norton Rose Fulbright US LLP

(57) ABSTRACT

In one aspect, a method of wireless communication includes determining, by a user equipment (UE), beamforming information for two or more frequency bands. The method also includes determining, by the UE, an inter-band carrier aggregation (CA) mode based on the beamforming information and one or more conditions. The method further includes transmitting, by the UE, a message indicating the inter-band CA mode. Other aspects and features are also claimed and described.

30 Claims, 9 Drawing Sheets

(56) References Cited

U.S. PATENT DOCUMENTS

| | | | | |
|---|---|---|---|---|
| 2017/0290041 | A1* | 10/2017 | Rico Alvarino | H04W 72/0453 |
| 2018/0084549 | A1* | 3/2018 | Liu | H04W 36/0058 |
| 2019/0341986 | A1* | 11/2019 | Raghavan | H04B 17/327 |
| 2020/0029316 | A1* | 1/2020 | Zhou | H04W 74/0833 |
| 2020/0145079 | A1* | 5/2020 | Marinier | H04W 52/52 |
| 2020/0259618 | A1* | 8/2020 | Yang | H04W 24/00 |
| 2020/0274656 | A1* | 8/2020 | Gordaychik | H04L 67/125 |
| 2020/0374960 | A1* | 11/2020 | Deenoo | H04W 72/1284 |
| 2021/0100061 | A1* | 4/2021 | Park | H04W 28/0268 |
| 2021/0105780 | A1* | 4/2021 | Jin | H04L 5/0053 |
| 2022/0116089 | A1* | 4/2022 | Khoryaev | H04B 7/0695 |
| 2022/0167315 | A1* | 5/2022 | Park | H04W 72/1284 |

OTHER PUBLICATIONS

Partial International Search Report—PCT/US2021/033266—ISA/EPO—dated Sep. 2, 2021 (203608WO).

* cited by examiner

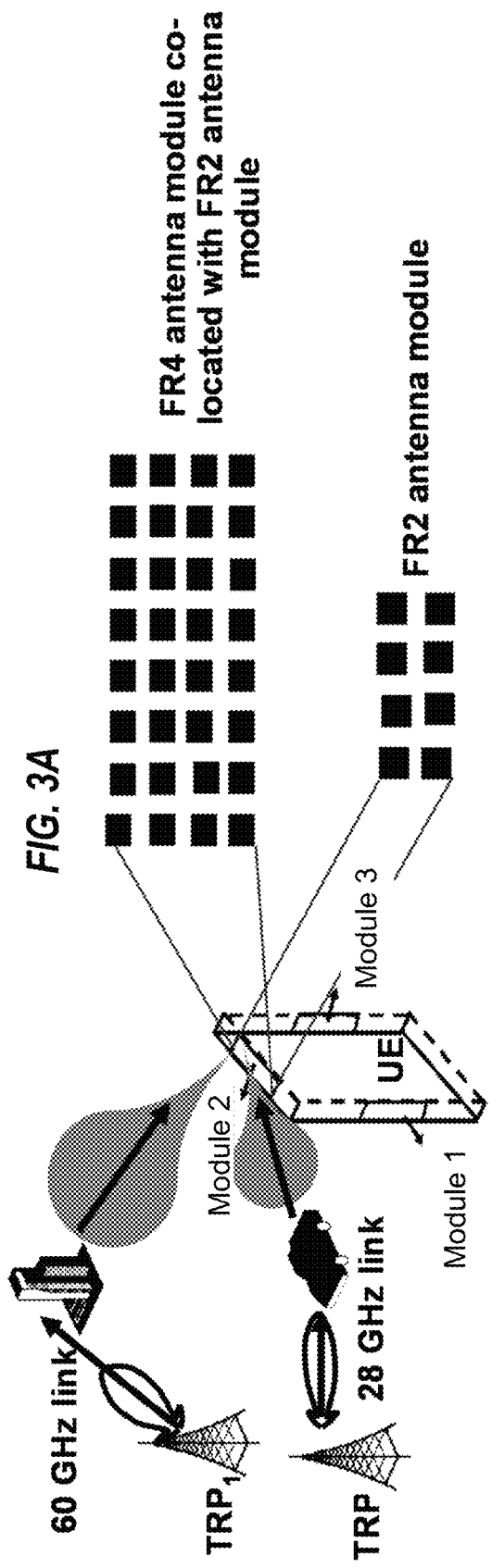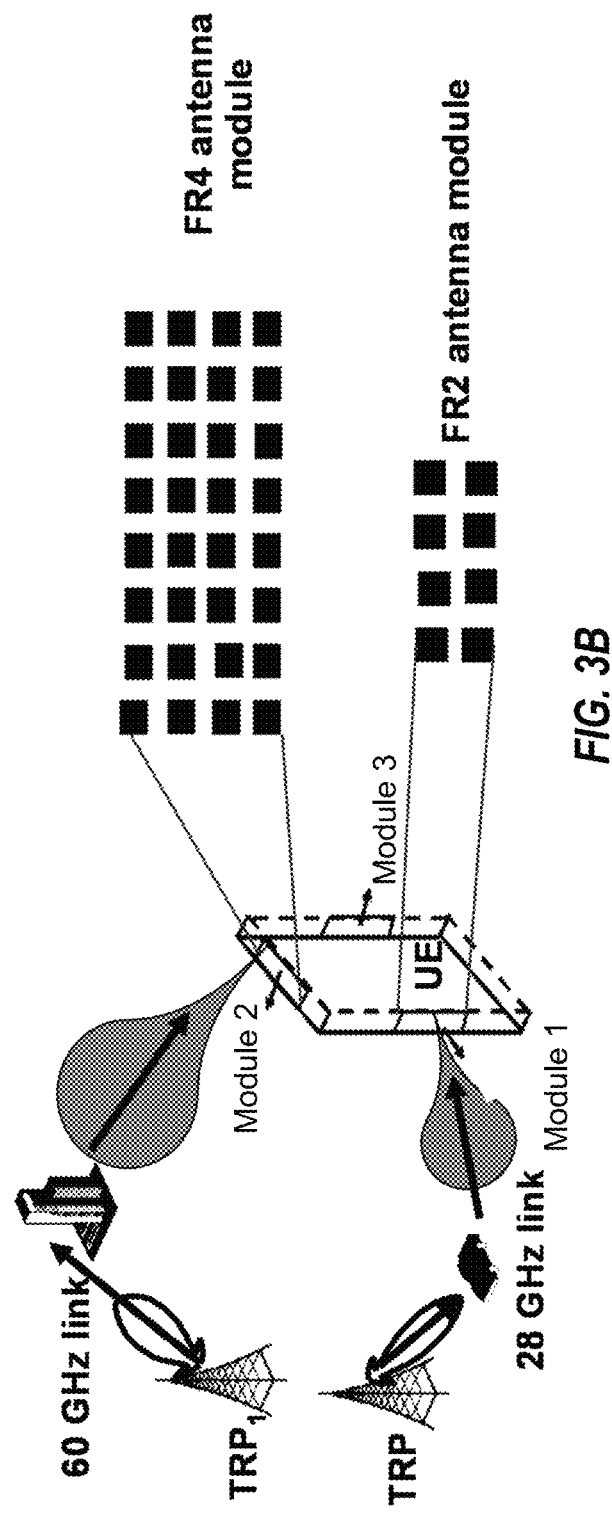

UE BASED DETERMINATION OF INTER-BAND CARRIER AGGREGATION MODES

CROSS-REFERENCE TO RELATED APPLICATIONS

This application claims the benefit of U.S. Provisional Patent Application No. 63/038,506, entitled, "UE BASED DETERMINATION OF INTER-BAND CARRIER AGGREGATION MODES," filed on Jun. 12, 2020, which is expressly incorporated by reference herein in its entirety.

TECHNICAL FIELD

Aspects of the present disclosure relate generally to wireless communication systems, and more particularly, to inter-band carrier aggregation. Certain embodiments of the technology discussed below can enable and provide UE based inter-band carrier aggregation mode determination/selection.

INTRODUCTION

Wireless communication networks are widely deployed to provide various communication services such as voice, video, packet data, messaging, broadcast, and the like. These wireless networks may be multiple-access networks capable of supporting multiple users by sharing the available network resources. Such networks, which are usually multiple access networks, support communications for multiple users by sharing the available network resources.

A wireless communication network may include a number of base stations or node Bs that can support communication for a number of user equipments (UEs). A UE may communicate with a base station via downlink and uplink. The downlink (or forward link) refers to the communication link from the base station to the UE, and the uplink (or reverse link) refers to the communication link from the UE to the base station.

A base station may transmit data and control information on the downlink to a UE and/or may receive data and control information on the uplink from the UE. On the downlink, a transmission from the base station may encounter interference due to transmissions from neighbor base stations or from other wireless radio frequency (RF) transmitters. On the uplink, a transmission from the UE may encounter interference from uplink transmissions of other UEs communicating with the neighbor base stations or from other wireless RF transmitters. This interference may degrade performance on both the downlink and uplink.

As the demand for mobile broadband access continues to increase, the possibilities of interference and congested networks grows with more UEs accessing the long-range wireless communication networks and more short-range wireless systems being deployed in communities. Research and development continue to advance wireless technologies not only to meet the growing demand for mobile broadband access, but to advance and enhance the user experience with mobile communications.

BRIEF SUMMARY OF SOME EMBODIMENTS

The following summarizes some aspects of the present disclosure to provide a basic understanding of the discussed technology. This summary is not an extensive overview of all contemplated features of the disclosure and is intended neither to identify key or critical elements of all aspects of the disclosure nor to delineate the scope of any or all aspects of the disclosure. Its sole purpose is to present some concepts of one or more aspects of the disclosure in summary form as a prelude to the more detailed description that is presented later.

In one aspect of the disclosure, a method of wireless communication includes determining, by a user equipment (UE), beamforming information for two or more frequency bands, determining, by the UE, an inter-band carrier aggregation (CA) mode based on the beamforming information and one or more conditions, and transmitting, by the UE, a message indicating the inter-band CA mode.

In an additional aspect of the disclosure, an apparatus configured for wireless communication is disclosed. The apparatus includes means for determining beamforming information for two or more frequency bands, means for determining an inter-band carrier aggregation (CA) mode based on the beamforming information and one or more conditions, and means for transmitting a message indicating the inter-band CA mode.

In an additional aspect of the disclosure, a non-transitory computer-readable medium having program code recorded thereon. The program code further includes code to determine beamforming information for two or more frequency bands, determine an inter-band carrier aggregation (CA) mode based on the beamforming information and one or more conditions, and transmit a message indicating the inter-band CA mode.

In an additional aspect of the disclosure, an apparatus configured for wireless communication is disclosed. The apparatus includes at least one processor, and a memory coupled to the processor. The processor is configured to determine beamforming information for two or more frequency bands, determine an inter-band carrier aggregation (CA) mode based on the beamforming information and one or more conditions, and transmit a message indicating the inter-band CA mode.

In another aspect, a method of wireless communication includes transmitting, by a network device, a transmission configured to cause a user equipment (UE) to perform inter-band carrier aggregation (CA) selection operations, and receiving a message indicating an inter-band CA mode.

In an additional aspect of the disclosure, an apparatus configured for wireless communication is disclosed. The apparatus includes means for transmitting a transmission configured to cause a user equipment (UE) to perform inter-band carrier aggregation (CA) selection operations, and means for receiving a message indicating an inter-band CA mode.

In an additional aspect of the disclosure, a non-transitory computer-readable medium having program code recorded thereon. The program code further includes code to transmit a transmission configured to cause a user equipment (UE) to perform inter-band carrier aggregation (CA) selection operations, and receive a message indicating an inter-band CA mode.

In an additional aspect of the disclosure, an apparatus configured for wireless communication is disclosed. The apparatus includes at least one processor, and a memory coupled to the processor. The processor is configured to transmit a transmission configured to cause a user equipment (UE) to perform inter-band carrier aggregation (CA) selection operations, and receive a message indicating an inter-band CA mode.

In another aspect, a method of wireless communication includes transmitting, by a network device, a pilot signal for beam determination operations, and receiving, by the network device, a message indicating an inter-band carrier aggregation (CA) mode.

Other aspects, features, and embodiments will become apparent to those of ordinary skill in the art, upon reviewing the following description of specific, exemplary embodiments in conjunction with the accompanying figures. While features may be discussed relative to certain embodiments and figures below, all embodiments can include one or more of the advantageous features discussed herein. In other words, while one or more embodiments may be discussed as having certain advantageous features, one or more of such features may also be used in accordance with the various embodiments. In similar fashion, while exemplary embodiments may be discussed below as device, system, or method embodiments the exemplary embodiments can be implemented in various devices, systems, and methods.

BRIEF DESCRIPTION OF THE DRAWINGS

A further understanding of the nature and advantages of the present disclosure may be realized by reference to the following drawings. In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

FIG. 3A is a diagram of an example of intra-module inter-band carrier aggregation operations according to some embodiments of the present disclosure.

FIG. 3B is a diagram of an example of inter-module inter-band carrier aggregation operations according to some embodiments of the present disclosure.

DETAILED DESCRIPTION

Figure 1:
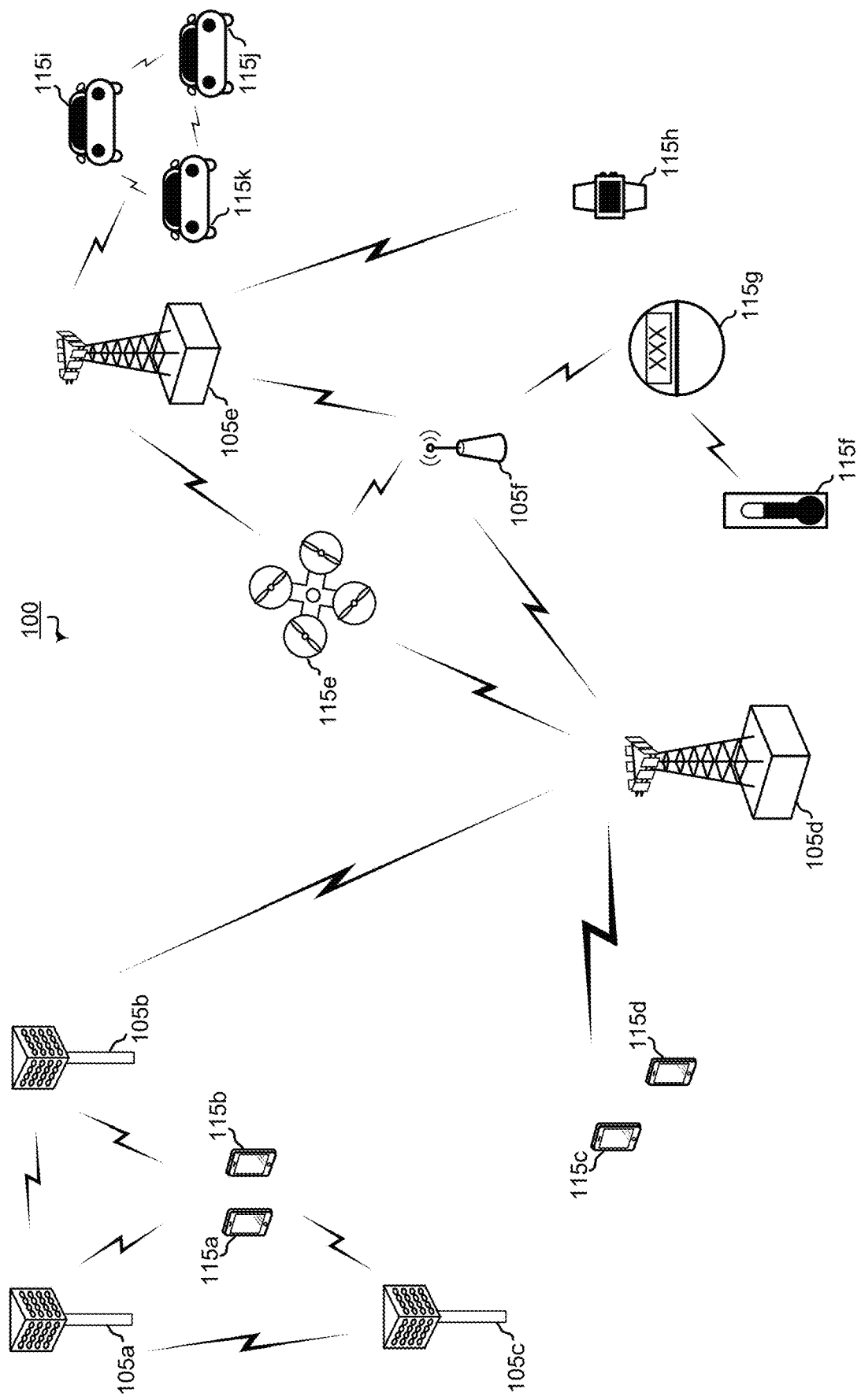
FIG. 1 is a block diagram illustrating details of a wireless communication system according to some embodiments of the present disclosure.

The detailed description set forth below, in connection with the appended drawings, is intended as a description of various configurations and is not intended to limit the scope of the disclosure. Rather, the detailed description includes specific details for the purpose of providing a thorough understanding of the inventive subject matter. It will be apparent to those skilled in the art that these specific details are not required in every case and that, in some instances, well-known structures and components are shown in block diagram form for clarity of presentation.

The present disclosure is related to UE based inter-band carrier aggregation mode determination and/or selection operations for wireless communications. Conventionally, inter-band carrier aggregation mode selection is performed by network entities, such as base stations or transmission reception points (TRPs). For example, a host node (e.g., base station) may periodically determine an inter-band carrier aggregation mode independently or based on generic UE feedback. However, when performing such conventional inter-band carrier aggregation mode selection, network based selection may not account for relevant and determining factors in inter-band carrier aggregation mode performance. For example, different inter-band carrier aggregation mode have different tradeoffs and provide better performance in different conditions. Thus, network performance can be enhanced by improved determination and/or selection of inter-band carrier aggregation mode based on UE input.

The described techniques relate to improved methods, systems, devices, and apparatuses that support UE based inter-band carrier aggregation mode determination and/or selection. A user equipment (UE) may determine beam performance for beams in two or more frequency bands, and determine an inter-band carrier aggregation mode based on the beam performance and one or more "trigger" conditions. The trigger conditions may include UE power, thermal, and channel related information, as illustrative examples, and thus may account for UE related factors and conditions. The UE may then signal the inter-band carrier aggregation mode directly or indirectly to the network, such as a base station thereof (e.g., gNB). Accordingly, such techniques may increase reliability and throughput when operating in inter-band carrier aggregation modes.

This disclosure relates generally to providing or participating in communication as between two or more wireless devices in one or more wireless communications systems, also referred to as wireless communications networks. In various embodiments, the techniques and apparatus may be used for wireless communication networks such as code division multiple access (CDMA) networks, time division multiple access (TDMA) networks, frequency division multiple access (FDMA) networks, orthogonal FDMA (OFDMA) networks, single-carrier FDMA (SC-FDMA) networks, LTE networks, GSM networks, $5^{th}$ Generation (5G) or new radio (NR) networks (sometimes referred to as "5G NR" networks/systems/devices), as well as other communications networks. As described herein, the terms "networks" and "systems" may be used interchangeably.

A CDMA network, for example, may implement a radio technology such as universal terrestrial radio access (UTRA), cdma2000, and the like. UTRA includes wideband-CDMA (W-CDMA) and low chip rate (LCR). CDMA2000 covers IS-2000, IS-95, and IS-856 standards.

A TDMA network may, for example implement a radio technology such as GSM. 3GPP defines standards for the GSM EDGE (enhanced data rates for GSM evolution) radio access network (RAN), also denoted as GERAN. GERAN is the radio component of GSM/EDGE, together with the network that joins the base stations (for example, the Ater and Abis interfaces) and the base station controllers (A interfaces, etc.). The radio access network represents a component of a GSM network, through which phone calls and packet data are routed from and to the public switched telephone network (PSTN) and Internet to and from subscriber handsets, also known as user terminals or user equipments (UEs). A mobile phone operator's network may comprise one or more GERANs, which may be coupled with Universal Terrestrial Radio Access Networks (UTRANs) in the case of a UMTS/GSM network. An operator network may also include one or more LTE networks, and/or one or more other networks. The various different network types may use different radio access technologies (RATs) and radio access networks (RANs).

An OFDMA network may implement a radio technology such as evolved UTRA (E-UTRA), IEEE 802.11, IEEE 802.16, IEEE 802.20, flash-OFDM and the like. UTRA, E-UTRA, and Global System for Mobile Communications (GSM) are part of universal mobile telecommunication system (UMTS). In particular, long term evolution (LTE) is a release of UMTS that uses E-UTRA. UTRA, E-UTRA, GSM, UMTS and LTE are described in documents provided from an organization named "3rd Generation Partnership Project" (3GPP), and cdma2000 is described in documents from an organization named "3rd Generation Partnership Project 2" (3GPP2). These various radio technologies and standards are known or are being developed. For example, the 3rd Generation Partnership Project (3GPP) is a collaboration between groups of telecommunications associations that aims to define a globally applicable third generation (3G) mobile phone specification. 3GPP long term evolution (LTE) is a 3GPP project which was aimed at improving the universal mobile telecommunications system (UMTS) mobile phone standard. The 3GPP may define specifications for the next generation of mobile networks, mobile systems, and mobile devices. The present disclosure is concerned with the evolution of wireless technologies from LTE, 4G, 5G, NR, and beyond with shared access to wireless spectrum between networks using a collection of new and different radio access technologies or radio air interfaces.

5G networks contemplate diverse deployments, diverse spectrum, and diverse services and devices that may be implemented using an OFDM-based unified, air interface. To achieve these goals, further enhancements to LTE and LTE-A are considered in addition to development of the new radio technology for 5G NR networks. The 5G NR will be capable of scaling to provide coverage (1) to a massive Internet of things (IoTs) with an ultra-high density (e.g., ~1M nodes/km$^2$), ultra-low complexity (e.g., ~10 s of bits/sec), ultra-low energy (e.g., ~10+ years of battery life), and deep coverage with the capability to reach challenging locations; (2) including mission-critical control with strong security to safeguard sensitive personal, financial, or classified information, ultra-high reliability (e.g., ~99.9999% reliability), ultra-low latency (e.g., ~1 ms), and users with wide ranges of mobility or lack thereof; and (3) with enhanced mobile broadband including extreme high capacity (e.g., ~10 Tbps/km$^2$), extreme data rates (e.g., multi-Gbps rate, 100+ Mbps user experienced rates), and deep awareness with advanced discovery and optimizations.

5G NR devices, networks, and systems may be implemented to use optimized OFDM-based waveform features. These features may include scalable numerology and transmission time intervals (TTIs); a common, flexible framework to efficiently multiplex services and features with a dynamic, low-latency time division duplex (TDD)/frequency division duplex (FDD) design; and advanced wireless technologies, such as massive multiple input, multiple output (MIMO), robust millimeter wave (mmWave) transmissions, advanced channel coding, and device-centric mobility. Scalability of the numerology in 5G NR, with scaling of subcarrier spacing, may efficiently address operating diverse services across diverse spectrum and diverse deployments. For example, in various outdoor and macro coverage deployments of less than 3 GHz FDD/TDD implementations, subcarrier spacing may occur with 15 kHz, for example over 1, 5, 10, 20 MHz, and the like bandwidth. For other various outdoor and small cell coverage deployments of TDD greater than 3 GHz, subcarrier spacing may occur with 30 kHz over 80/100 MHz bandwidth. For other various indoor wideband implementations, using a TDD over the unlicensed portion of the 5 GHz band, the subcarrier spacing may occur with 60 kHz over a 160 MHz bandwidth. Finally, for various deployments transmitting with mmWave components at a TDD of 28 GHz, subcarrier spacing may occur with 120 kHz over a 500 MHz bandwidth.

The scalable numerology of 5G NR facilitates scalable TTI for diverse latency and quality of service (QoS) requirements. For example, shorter TTI may be used for low latency and high reliability, while longer TTI may be used for higher spectral efficiency. The efficient multiplexing of long and short TTIs to allow transmissions to start on symbol boundaries. 5G NR also contemplates a self-contained integrated subframe design with uplink/downlink scheduling information, data, and acknowledgement in the same subframe. The self-contained integrated subframe supports communications in unlicensed or contention-based shared spectrum, adaptive uplink/downlink that may be flexibly configured on a per-cell basis to dynamically switch between uplink and downlink to meet the current traffic needs.

For clarity, certain aspects of the apparatus and techniques may be described below with reference to exemplary LTE implementations or in an LTE-centric way, and LTE terminology may be used as illustrative examples in portions of the description below; however, the description is not intended to be limited to LTE applications. Indeed, the present disclosure is concerned with shared access to wireless spectrum between networks using different radio access technologies or radio air interfaces, such as those of 5G NR.

Moreover, it should be understood that, in operation, wireless communication networks adapted according to the concepts herein may operate with any combination of licensed or unlicensed spectrum depending on loading and availability. Accordingly, it will be apparent to one of skill in the art that the systems, apparatus and methods described herein may be applied to other communications systems and applications than the particular examples provided.

While aspects and embodiments are described in this application by illustration to some examples, those skilled in the art will understand that additional implementations and use cases may come about in many different arrangements and scenarios. Innovations described herein may be implemented across many differing platform types, devices, systems, shapes, sizes, packaging arrangements. For example, embodiments and/or uses may come about via integrated chip embodiments and/or other non-module-component based devices (e.g., end-user devices, vehicles, communication devices, computing devices, industrial equipment, retail/purchasing devices, medical devices, AI-enabled devices, etc.). While some examples may or may not be specifically directed to use cases or applications, a wide assortment of applicability of described innovations may occur. Implementations may range from chip-level or modular components to non-modular, non-chip-level implementations and further to aggregated, distributed, or OEM devices or systems incorporating one or more described aspects. In some practical settings, devices incorporating described aspects and features may also necessarily include additional components and features for implementation and practice of claimed and described embodiments. It is intended that innovations described herein may be practiced in a wide variety of implementations, including both large/small devices, chip-level components, multi-component systems (e.g. RF-chain, communication interface, processor), distributed arrangements, end-user devices, etc. of varying sizes, shapes, and constitution.

FIG. 1 shows wireless network 100 for communication according to some embodiments. Wireless network 100 may, for example, comprise a 5G wireless network. As appreciated by those skilled in the art, components appearing in FIG. 1 are likely to have related counterparts in other network arrangements including, for example, cellular-style network arrangements and non-cellular-style-network arrangements (e.g., device to device or peer to peer or ad hoc network arrangements, etc.).

Wireless network 100 illustrated in FIG. 1 includes a number of base stations 105 and other network entities. A base station may be a station that communicates with the UEs and may also be referred to as an evolved node B (eNB), a next generation eNB (gNB), an access point, and the like. Each base station 105 may provide communication coverage for a particular geographic area. In 3GPP, the term "cell" can refer to this particular geographic coverage area of a base station and/or a base station subsystem serving the coverage area, depending on the context in which the term is used. In implementations of wireless network 100 herein, base stations 105 may be associated with a same operator or different operators (e.g., wireless network 100 may comprise a plurality of operator wireless networks), and may provide wireless communications using one or more of the same frequencies (e.g., one or more frequency bands in licensed spectrum, unlicensed spectrum, or a combination thereof) as a neighboring cell. In some examples, an individual base station 105 or UE 115 may be operated by more than one network operating entity. In other examples, each base station 105 and UE 115 may be operated by a single network operating entity.

A base station may provide communication coverage for a macro cell or a small cell, such as a pico cell or a femto cell, and/or other types of cell. A macro cell generally covers a relatively large geographic area (e.g., several kilometers in radius) and may allow unrestricted access by UEs with service subscriptions with the network provider. A small cell, such as a pico cell, would generally cover a relatively smaller geographic area and may allow unrestricted access by UEs with service subscriptions with the network provider. A small cell, such as a femto cell, would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). A base station for a macro cell may be referred to as a macro base station. A base station for a small cell may be referred to as a small cell base station, a pico base station, a femto base station or a home base station. In the example shown in FIG. 1, base stations 105d and 105e are regular macro base stations, while base stations 105a-105c are macro base stations enabled with one of 3 dimension (3D), full dimension (FD), or massive MIMO. Base stations 105a-105c take advantage of their higher dimension MIMO capabilities to exploit 3D beamforming in both elevation and azimuth beamforming to increase coverage and capacity. Base station 105f is a small cell base station which may be a home node or portable access point. A base station may support one or multiple (e.g., two, three, four, and the like) cells.

Wireless network 100 may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. In some scenarios, networks may be enabled or configured to handle dynamic switching between synchronous or asynchronous operations.

UEs 115 are dispersed throughout the wireless network 100, and each UE may be stationary or mobile. It should be appreciated that, although a mobile apparatus is commonly referred to as user equipment (UE) in standards and specifications promulgated by the 3rd Generation Partnership Project (3GPP), such apparatus may also be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, a gaming device, an augmented reality device, vehicular component device/module, or some other suitable terminology. Within the present document, a "mobile" apparatus or UE need not necessarily have a capability to move, and may be stationary. Some non-limiting examples of a mobile apparatus, such as may comprise embodiments of one or more of UEs 115, include a mobile, a cellular (cell) phone, a smart phone, a session initiation protocol (SIP) phone, a wireless local loop (WLL) station, a laptop, a personal computer (PC), a notebook, a netbook, a smart book, a tablet, and a personal digital assistant (PDA). A mobile apparatus may additionally be an "Internet of things" (IoT) or "Internet of everything" (IoE) device such as an automotive or other transportation vehicle, a satellite radio, a global positioning system (GPS) device, a logistics controller, a drone, a multi-copter, a quad-copter, a smart energy or security device, a solar panel or solar array, municipal lighting, water, or other infrastructure; industrial automation and enterprise devices; consumer and wearable devices, such as eyewear, a wearable camera, a smart watch, a health or fitness tracker, a mammal implantable device, gesture tracking device, medical device, a digital audio player (e.g., MP3 player), a camera, a game console, etc.; and digital home or smart home devices such as a home audio, video, and multimedia device, an appliance, a sensor, a vending machine, intelligent lighting, a home security system, a smart meter, etc. In one aspect, a UE may be a device that includes a Universal Integrated Circuit Card (UICC). In another aspect, a UE may be a device that does not include a UICC. In some aspects, UEs that do not include UICCs may also be referred to as IoE devices. UEs 115a-115d of the embodiment illustrated in FIG. 1 are examples of mobile smart phone-type devices accessing wireless network 100 A UE may also be a machine specifically configured for connected communication, including machine type communication (MTC), enhanced MTC (eMTC), narrowband IoT (NB-IoT) and the like. UEs 115e-115k illustrated in FIG. 1 are examples of various machines configured for communication that access wireless network 100.

A mobile apparatus, such as UEs 115, may be able to communicate with any type of the base stations, whether macro base stations, pico base stations, femto base stations, relays, and the like. In FIG. 1, a lightning bolt (e.g., communication link) indicates wireless transmissions between a UE and a serving base station, which is a base station designated to serve the UE on the downlink and/or uplink, or desired transmission between base stations, and backhaul transmissions between base stations. UEs may operate as base stations or other network nodes in some scenarios. Backhaul communication between base stations of wireless network 100 may occur using wired and/or wireless communication links.

In operation at wireless network 100, base stations 105a-105c serve UEs 115a and 115b using 3D beamforming and coordinated spatial techniques, such as coordinated multi-point (CoMP) or multi-connectivity. Macro base station 105d performs backhaul communications with base stations 105a-105c, as well as small cell, base station 105f. Macro base station 105d also transmits multicast services which are subscribed to and received by UEs 115c and 115d. Such multicast services may include mobile television or stream video, or may include other services for providing community information, such as weather emergencies or alerts, such as Amber alerts or gray alerts.

Wireless network 100 of embodiments supports mission critical communications with ultra-reliable and redundant links for mission critical devices, such UE 115e, which is a drone. Redundant communication links with UE 115e include from macro base stations 105d and 105e, as well as small cell base station 105f. Other machine type devices, such as UE 115f (thermometer), UE 115g (smart meter), and UE 115h (wearable device) may communicate through wireless network 100 either directly with base stations, such as small cell base station 105f, and macro base station 105e, or in multi-hop configurations by communicating with another user device which relays its information to the network, such as UE 115f communicating temperature measurement information to the smart meter, UE 115g, which is then reported to the network through small cell base station 105f. Wireless network 100 may also provide additional network efficiency through dynamic, low-latency TDD/FDD communications, such as in a vehicle-to-vehicle (V2V) mesh network between UEs 115i-115k communicating with macro base station 105e.

Figure 2:
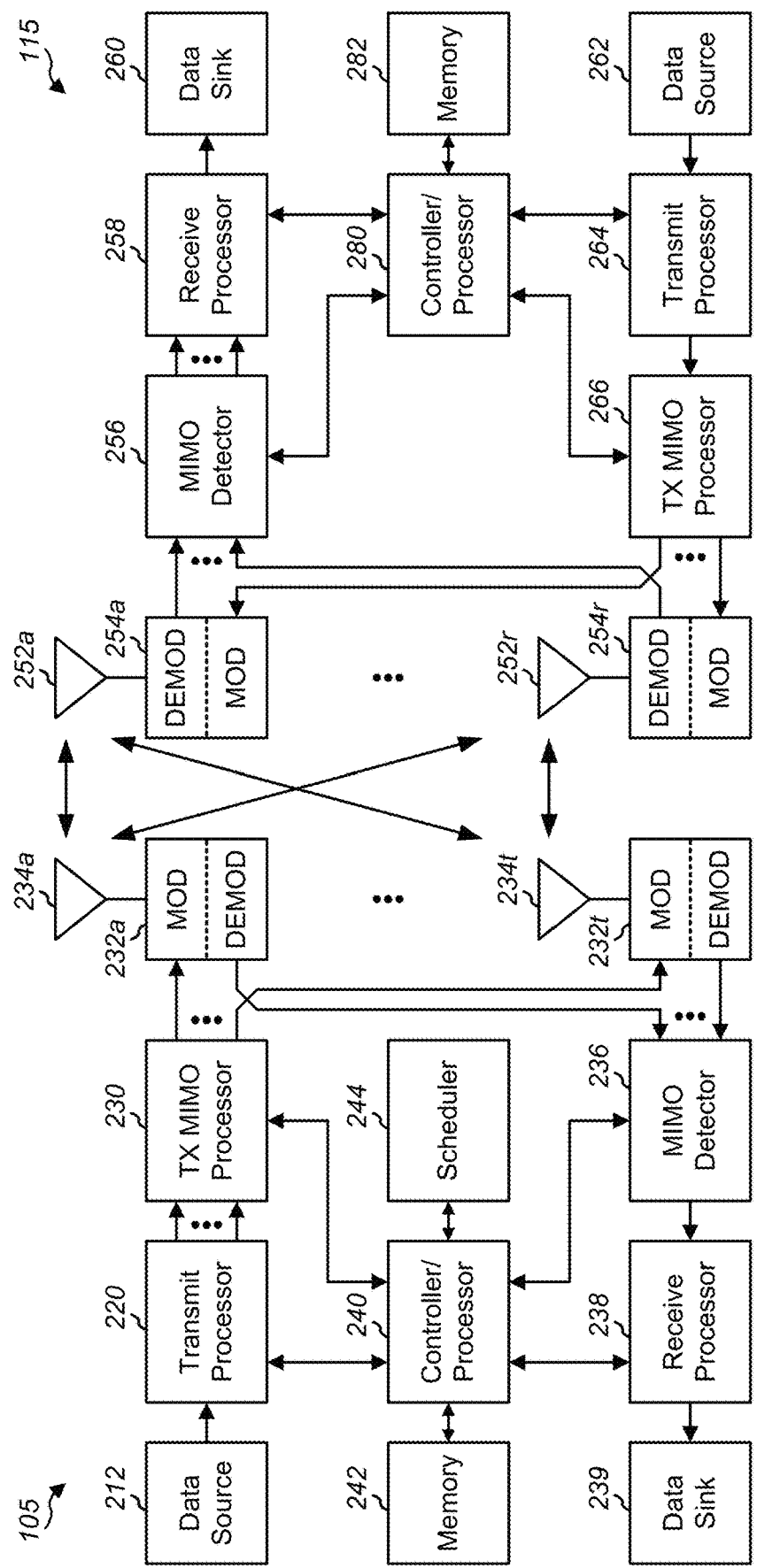
FIG. 2 is a block diagram conceptually illustrating a design of a base station and a UE configured according to some embodiments of the present disclosure.

FIG. 2 shows a block diagram of a design of a base station 105 and a UE 115, which may be any of the base stations and one of the UEs in FIG. 1. For a restricted association scenario (as mentioned above), base station 105 may be small cell base station 105f in FIG. 1, and UE 115 may be UE 115c or 115D operating in a service area of base station 105f, which in order to access small cell base station 105f, would be included in a list of accessible UEs for small cell base station 105f. Base station 105 may also be a base station of some other type. As shown in FIG. 2, base station 105 may be equipped with antennas 234a through 234t, and UE 115 may be equipped with antennas 252a through 252r for facilitating wireless communications.

At base station 105, transmit processor 220 may receive data from data source 212 and control information from controller/processor 240. The control information may be for the physical broadcast channel (PBCH), physical control format indicator channel (PCFICH), physical hybrid-ARQ (automatic repeat request) indicator channel (PHICH), physical downlink control channel (PDCCH), enhanced physical downlink control channel (EPDCCH), MTC physical downlink control channel (MPDCCH), etc. The data may be for the PDSCH, etc. Transmit processor 220 may process (e.g., encode and symbol map) the data and control information to obtain data symbols and control symbols, respectively. Transmit processor 220 may also generate reference symbols, e.g., for the primary synchronization signal (PSS) and secondary synchronization signal (SSS), and cell-specific reference signal. Transmit (TX) multiple-input multiple-output (MIMO) processor 230 may perform spatial processing (e.g., precoding) on the data symbols, the control symbols, and/or the reference symbols, if applicable, and may provide output symbol streams to modulators (MODs) 232a through 232t. Each modulator 232 may process a respective output symbol stream (e.g., for OFDM, etc.) to obtain an output sample stream. Each modulator 232 may additionally or alternatively process (e.g., convert to analog, amplify, filter, and upconvert) the output sample stream to obtain a downlink signal. Downlink signals from modulators 232a through 232t may be transmitted via antennas 234a through 234t, respectively.

At UE 115, the antennas 252a through 252r may receive the downlink signals from base station 105 and may provide received signals to demodulators (DEMODs) 254a through 254r, respectively. Each demodulator 254 may condition (e.g., filter, amplify, downconvert, and digitize) a respective received signal to obtain input samples. Each demodulator 254 may further process the input samples (e.g., for OFDM, etc.) to obtain received symbols. MIMO detector 256 may obtain received symbols from demodulators 254a through 254r, perform MIMO detection on the received symbols if applicable, and provide detected symbols. Receive processor 258 may process (e.g., demodulate, deinterleave, and decode) the detected symbols, provide decoded data for UE 115 to data sink 260, and provide decoded control information to controller/processor 280.

On the uplink, at UE 115, transmit processor 264 may receive and process data (e.g., for the physical uplink shared channel (PUSCH)) from data source 262 and control information (e.g., for the physical uplink control channel (PUCCH)) from controller/processor 280. Transmit processor 264 may also generate reference symbols for a reference signal. The symbols from transmit processor 264 may be precoded by TX MIMO processor 266 if applicable, further processed by modulators 254a through 254r (e.g., for SC-FDM, etc.), and transmitted to base station 105. At base station 105, the uplink signals from UE 115 may be received by antennas 234, processed by demodulators 232, detected by MIMO detector 236 if applicable, and further processed by receive processor 238 to obtain decoded data and control information sent by UE 115. Processor 238 may provide the decoded data to data sink 239 and the decoded control information to controller/processor 240.

Controllers/processors 240 and 280 may direct the operation at base station 105 and UE 115, respectively. Controller/processor 240 and/or other processors and modules at base station 105 and/or controller/processor 280 and/or other processors and modules at UE 115 may perform or direct the execution of various processes for the techniques described herein, such as to perform or direct the execution illustrated in FIGS. 7 and 8, and/or other processes for the techniques described herein. Memories 242 and 282 may store data and program codes for base station 105 and UE 115, respectively. Scheduler 244 may schedule UEs for data transmission on the downlink and/or uplink.

Wireless communications systems operated by different network operating entities (e.g., network operators) may share spectrum. In some instances, a network operating entity may be configured to use an entirety of a designated shared spectrum for at least a period of time before another network operating entity uses the entirety of the designated shared spectrum for a different period of time. Thus, in order to allow network operating entities use of the full designated shared spectrum, and in order to mitigate interfering communications between the different network operating entities, certain resources (e.g., time) may be partitioned and allocated to the different network operating entities for certain types of communication.

For example, a network operating entity may be allocated certain time resources reserved for exclusive communication by the network operating entity using the entirety of the shared spectrum. The network operating entity may also be allocated other time resources where the entity is given priority over other network operating entities to communicate using the shared spectrum. These time resources, prioritized for use by the network operating entity, may be utilized by other network operating entities on an opportunistic basis if the prioritized network operating entity does not utilize the resources. Additional time resources may be allocated for any network operator to use on an opportunistic basis.

Access to the shared spectrum and the arbitration of time resources among different network operating entities may be centrally controlled by a separate entity, autonomously determined by a predefined arbitration scheme, or dynamically determined based on interactions between wireless nodes of the network operators.

In some cases, UE 115 and base station 105 may operate in a shared radio frequency spectrum band, which may include licensed or unlicensed (e.g., contention-based) frequency spectrum. In an unlicensed frequency portion of the shared radio frequency spectrum band, UEs 115 or base stations 105 may traditionally perform a medium-sensing procedure to contend for access to the frequency spectrum. For example, UE 115 or base station 105 may perform a listen before talk (LBT) procedure such as a clear channel assessment (CCA) prior to communicating in order to determine whether the shared channel is available. A CCA may include an energy detection procedure to determine whether there are any other active transmissions. For example, a device may infer that a change in a received signal strength indicator (RSSI) of a power meter indicates that a channel is occupied. Specifically, signal power that is concentrated in a certain bandwidth and exceeds a predetermined noise floor may indicate another wireless transmitter. A CCA also may include detection of specific sequences that indicate use of the channel. For example, another device may transmit a specific preamble prior to transmitting a data sequence. In some cases, an LBT procedure may include a wireless node adjusting its own backoff window based on the amount of energy detected on a channel and/or the acknowledge/negative-acknowledge (ACK/NACK) feedback for its own transmitted packets as a proxy for collisions.

FIGS. 3A and 3B illustrate examples of inter-band carrier aggregation (CA) operations. In FIG. 3A, intra-module inter-band carrier aggregation (CA) operations are shown, and in FIG. 3B, inter-module inter-band carrier aggregation (CA) operations are shown. Intra-module inter-band CA operation corresponds to transmitting and/or receiving data via multiple layers across different bands within the same antenna module (e.g., co-mmWave modules) at the same time. Inter-module inter-band CA corresponds to transmitting and/or receiving data via multiple layers across different antenna modules at the same time.

In FIGS. 3A and 3B, multiple TRPs are illustrated, such as a first TRP (TRP1) and a second TRP (TRP2). The first and second TRPs may include or correspond to the same base station, such as the same gNB, or to different base stations. In FIGS. 3A and 3B, the first TRP (TRP1) is operating in a first frequency band, such as a first mmWave band, and the second TRP (TRP2) is operating in a second mmWave band that is lower than the first mmWave band.

Additionally, a particular UE, such as an inter-band CA capable UE with multiple antenna modules, is also illustrated in FIGS. 3A and 3B along with environmental objects, such as building and cars. FIGS. 3A and 3B further depict signal paths between the TRPs and specific antenna modules on the particular UE.

Although a particular configuration of antenna modules (including location, size, and type) is illustrated in FIGS. 3A and 3B, in other implementations, other configurations of antenna modules antenna modules may be used. Additionally, or alternatively, the UE may include fewer or greater numbers of antenna modules than illustrated in FIGS. 3A and 3B. In addition, the UE may also include different antenna array structures within the antenna modules (e.g., a 4×1 array, a 4×2 array, a 2×2 array, etc.).

Referring to FIG. 3A, FIG. 3A illustrates an example diagram 300 for intra-module inter-band carrier aggregation (CA) operation. Referring to FIG. 3, the diagram 300 illustrates two signal paths (clusters in the channel over which directional beamforming can be performed) for intra-module inter-band CA operations between the TRPs and the UE. In the example illustrated in FIG. 3A, the first TRP (TRP1) transmits downlink data via a first signal path and the second TRP (TRP2) transmits downlink data via a second signal path. The first signal path includes a path from the first TRP (TRP1) that reflects off a first object, such as a glass window in a building, and is received at a second antenna module (Module 2) of the UE. The second signal path includes a path from the second TRP (TRP2) that reflects off a second object, such as metal or glass of a car, and is received at the second antenna module (Module 2) of the UE.

The signal paths of FIG. 3A are received by the same antenna module. That is, a single antenna module, and corresponding circuitry, is used to receive, and possibly process, the two transmissions. Such a configuration may lead to power efficient reception (e.g., a reduction in power usage) by powering a single antenna module and receive circuitry.

Referring to FIG. 3B, FIG. 3B illustrates an example diagram 300 for inter-module inter-band carrier aggregation (CA) operations. Referring to FIG. 3, the diagram 300 illustrates two signal paths (clusters in the channel over which directional beamforming can be performed) for intra-module inter-band CA operation between the TRPs and the UE.

In the example illustrated in FIG. 3B, the first TRP (TRP1) transmits downlink data via a first signal path and the second TRP (TRP2) transmits downlink data via a second signal path. The first signal path includes a path from the first TRP (TRP1) that reflects off a first object, such as a glass window in a building, and is received at a second antenna module (Module 2) of the UE. The second signal path includes a path from the second TRP (TRP2) that reflects off a second object, such as metal or glass of a car, and is received at a first antenna module (Module 1) of the UE.

As compared to FIG. 3A, the signal paths of FIG. 3B are received by different antenna modules. That is, two antenna modules, and corresponding circuitry, are used to receive, and possibly process, the two transmissions. Such a configuration may reduce thermal overhead, such as a temperature of the antenna module, of the UE near the antenna module, of the corresponding circuitry, or a combination thereof. However, such a configuration may also utilize more power by powering two antenna modules and receive circuitry.

Each inter-band CA mode may have different utility in terms of deployment and advantages. For example, inter-module inter-band CA may be useful and may outperform intra-module inter-band CA when there is a richness of clusters and the clusters are uncorrelated. To illustrate, clusters may be considered rich and uncorrelated when the TRPs are non-co-located and the carrier frequency difference between the bands is greater than ten times the lower carrier frequency. As an illustrative example of a suitable carrier frequency difference, a first antenna may operate with a carrier frequency of 800 MHz and a second antenna may operate with a carrier frequency of 26 GHz.

As another example, intra-module inter-band CA may be useful and may outperform inter-module inter-band CA when clusters in both bands are correlated. To illustrate, the clusters in both bands me be considered correlated when the TRPs are co-located and the carrier frequency difference between the bands is about or less than two to three times the lower carrier frequency. As an illustrative example of a suitable carrier frequency difference, a first antenna may operate with a carrier frequency of 28 MHz and a second antenna may operate with a carrier frequency of 39 or 60 GHz. Accordingly, proper selection of inter-band CA modes can increase network performance (e.g., throughput) and/or impact UE performance (e.g., temperature and power usage).

The signal paths illustrated in FIGS. 3A and 3B may include or correspond to a high performing signal path or best signal path for their respective TRPs and/or frequency ranges. Additionally, although a downlink example is illustrated in FIGS. 3A and 3B, uplink operations are similar and may include beams on reverse signal paths.

Figure 4:
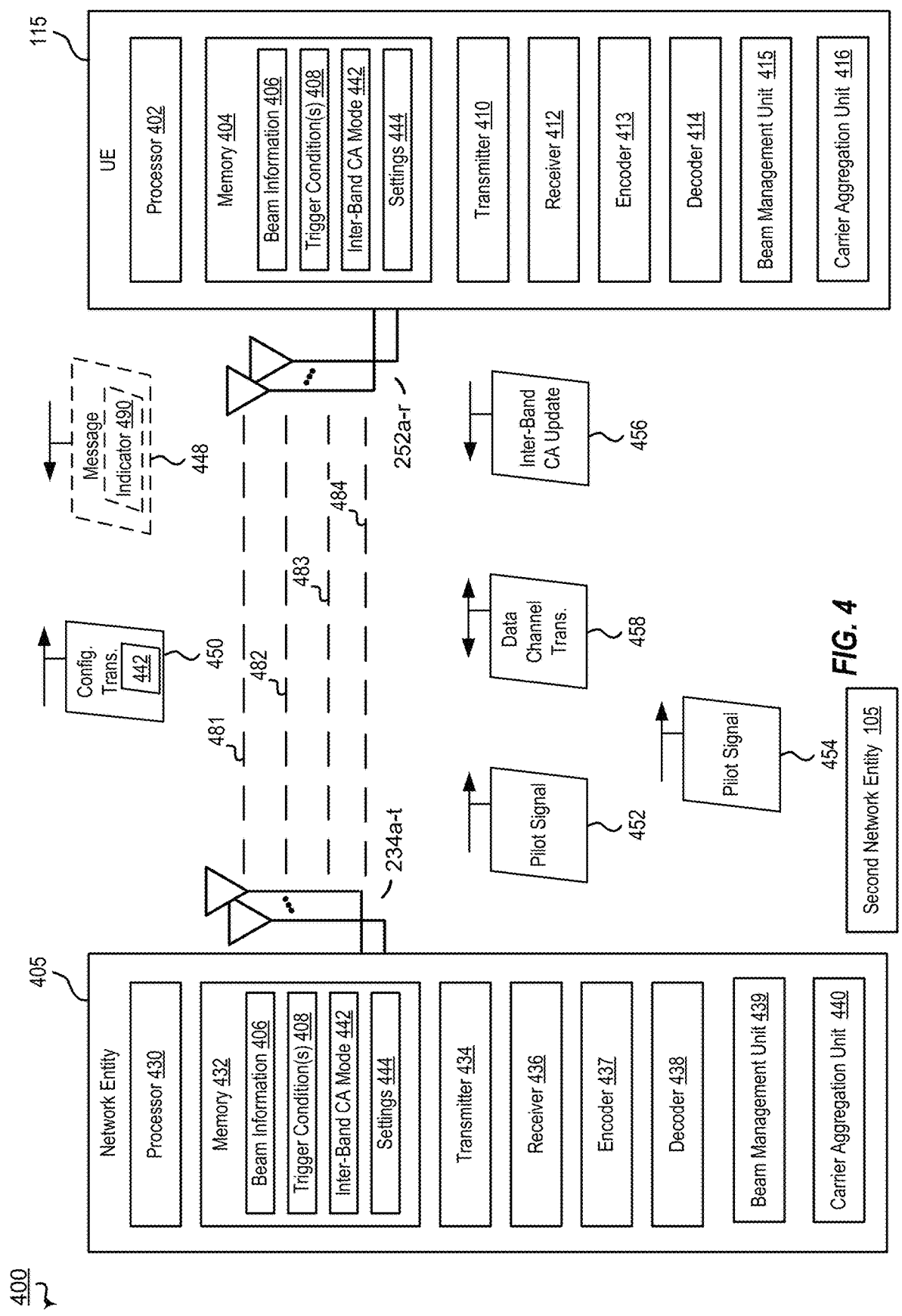
FIG. 4 is a block diagram illustrating an example of a wireless communications system (with a UE and base station) with UE based inter-band carrier aggregation mode selection according to some embodiments of the present disclosure.

FIG. 4 illustrates an example of a wireless communications system 400 that supports UE based inter-band CA mode triggering in accordance with aspects of the present disclosure. In some examples, wireless communications system 400 may implement aspects of wireless communication system 100. For example, wireless communications system 400 may include UE 115 and network entity 405. UE based inter-band CA mode triggering operations may increase throughput and reliability by updating inter-band CA mode more often and/or more accurately by taking into account UE based conditions and factors. Thus, network and device performance can be increased.

With intra-module or inter-module support for inter-band CA, multiple layers of data transmission and/or reception can be used at multiple carrier frequencies. Such intra-module inter-band CA support includes transmission and/or reception from the same or different TRP(s), and inter-module inter-band CA support includes transmission and/or reception from the same or different TRP(s).

The electromagnetic spectrum is often subdivided, based on frequency/wavelength, into various classes, bands, channels, etc. In 5G NR two initial operating bands have been identified as frequency range designations FR1 (410 MHz-7.125 GHz) and FR2 (24.25 GHz-52.6 GHz). The frequencies between FR1 and FR2 are often referred to as mid-band frequencies. Although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, or may be within the EHF band.

Network entity 405 and UE 115 UE 115 may be configured to communicate via frequency bands, such as one or more sub-6 GHz bands, and/or one or more millimeter wave (mmWave) bands. It is noted that sub-carrier spacing (SCS) may be equal to 15, 30, 60, 120 or 240 kHz for some data channels. Network entity 405 and UE 115 may be configured to communicate via one or more component carriers (CCs), such as representative first CC 481, second CC 482, third CC 483, and fourth CC 484. Although four CCs are shown, this is for illustration only, more or fewer than four CCs may be used. One or more CCs may be used to communicate control channel transmissions, data channel transmissions, and/or sidelink channel transmissions.

Such transmissions may include a Physical Downlink Control Channel (PDCCH), a Physical Downlink Shared Channel (PDSCH), a Physical Uplink Control Channel (PUCCH), a Physical Uplink Shared Channel (PUSCH), a Physical Sidelink Control Channel (PSCCH), a Physical Sidelink Shared Channel (PSSCH), or a Physical Sidelink Feedback Channel (PSFCH). Such transmissions may be scheduled by aperiodic grants and/or periodic grants.

Each periodic grant may have a corresponding configuration, such as configuration parameters/settings. The periodic grant configuration may include configured grant (CG) configurations and settings. Additionally, or alternatively, one or more periodic grants (e.g., CGs thereof) may have or be assigned to a CC ID, such as intended CC ID.

Each CC may have a corresponding configuration, such as configuration parameters/settings. The configuration may include bandwidth, bandwidth part, HARQ process, TCI state, RS, control channel resources, data channel resources, or a combination thereof. Additionally, or alternatively, one or more CCs may have or be assigned to a Cell ID, a Bandwidth Part (BWP) ID, or both. The Cell ID may include a unique cell ID for the CC, a virtual Cell ID, or a particular Cell ID of a particular CC of the plurality of CCs. Additionally, or alternatively, one or more CCs may have or be assigned to a HARQ ID. Each CC may also have corresponding management functionalities, such as, beam management, BWP switching functionality, or both. In some implementations, two or more CCs are quasi co-located, such that the CCs have the same beam and/or same symbol.

In some implementations, control information may be communicated via network entity 405 and UE 115. For example, the control information may be communicated suing MAC-CE transmissions, RRC transmissions, DCI, transmissions, another transmission, or a combination thereof.

UE 115 can include a variety of components (e.g., structural, hardware components) used for carrying out one or more functions described herein. For example, these components can includes processor 402, memory 404, transmitter 410, receiver 412, encoder, 413, decoder 414, beam management unit 415, carrier aggregation unit 416 and antennas 252a-r. Processor 402 may be configured to execute instructions stored at memory 404 to perform the operations described herein. In some implementations, processor 402 includes or corresponds to controller/processor 280, and memory 404 includes or corresponds to memory 282. Memory 404 may also be configured to store beam information data 406, conditions data 408, inter-band CA mode data 442, settings data 444, or a combination thereof, as further described herein.

The beam information data 406 includes or corresponds to data associated with or corresponding to beam performance information. For example, the beam information data 406 may include beam measurement data, Reference Signal Receive Power (RSRP), signal-to-noise ratio (SNR), beam direction/orientation (e.g., steering angle vector), beam correlation information between two frequency bands, beamwidth data, precoding matrix information (e.g., PMI), rank, Channel Quality Indicator (CQI), or a combination thereof. The conditions data 408 includes or corresponds to data indicating or corresponding to one or more conditions for triggering the sending of an inter-band CA mode indication message and/or evaluation of an inter-band CA mode, referred to herein as trigger conditions. For example, the trigger conditions may include or correspond to a UE capability, a band/channel supported, a UE condition, a channel condition, or a combination thereof, which are used to determine when to send an inter-band CA mode indication message and/or when to change inter-band CA modes.

The UE capability may include a number of antenna modules, a location of the antenna modules, a type of the antenna modules, or a combination thereof. The type of the antenna modules may include or correspond to a type of antenna element (such as dipoles/patches), a size of the antenna module (such as array shape/size), or a combination thereof. The UE condition may include a power level, a thermal level, data rate requirements, reliability requirements, self-blocking conditions, UE orientation, other blockage conditions (such as external environment and UE mobility related blockages), or a combination thereof. The channel condition may include or correspond to an amount of TRPs needed for supporting inter-band CA.

The inter-band CA mode data 442 includes or corresponds to data that indicates a determined or selected inter-band CA mode, either directly or indirectly. The inter-band CA mode data 442 may indicate a particular inter-band CA mode, such as intra-module, or indicate transmission settings (e.g., transmission parameters) or preferred beams which indicate or result in a particular inter-band CA mode. The settings data 444 includes or corresponds to data associated with UE, trigger conditions or both. The settings data 444 may include one or more thresholds (e.g., threshold values) for one or more trigger conditions, a trigger condition algorithm or weighting formula, trigger condition selection criteria, a UE based inter-band CA mode determination and/or selection mode, or a combination thereof. The trigger condition selection criteria may include one or more thresholds (e.g., threshold values) for selecting which trigger conditions to evaluate/apply based on an operating mode and/or UE conditions.

Transmitter 410 is configured to transmit data to one or more other devices, and receiver 412 is configured to receive data from one or more other devices. For example, transmitter 410 may transmit data, and receiver 412 may receive data, via a network, such as a wired network, a wireless network, or a combination thereof. For example, UE 115 may be configured to transmit and/or receive data via a direct device-to-device connection, a local area network (LAN), a wide area network (WAN), a modem-to-modem connection, the Internet, intranet, extranet, cable transmission system, cellular communication network, any combination of the above, or any other communications network now known or later developed within which permits two or more electronic devices to communicate. In some implementations, transmitter 410 and receiver 412 may be replaced with a transceiver. Additionally, or alternatively, transmitter 410, receiver, 412, or both may include or correspond to one or more components of UE 115 described with reference to FIG. 2.

Encoder 413 and decoder 414 may be configured to encode and decode data for transmission. Beam management unit 415 may be configured to determine and perform beam management and selection operations. For example, beam management unit 415 is configured to determine beam information and performance. To illustrate, beam management unit 415 may perform channel state feedback operations to determine high performing beams (or best beams) in multiple frequency bands. Additionally, the beam management unit 415 may correlate the high performing beams (or best beams). To illustrate, the beam management unit 415 may select a best beam in a first frequency band and a second best beam in a second frequency band based on both beams having the same orientation. In a particular implementations, the beam management unit 415 selects beams for uplink, downlink, or both, for uplink and/or downlink operations.

Carrier aggregation unit 416 may be configured to determine to use inter-band CA and a particular mode thereof. For example, carrier aggregation unit 416 is configured to determine and/or select a particular inter-band CA mode. To illustrate, carrier aggregation unit 416 is configured to evaluate one or more trigger conditions and determine the inter-band CA mode based on the trigger condition evaluations and the beam information generated by the beam management unit 415 or a beam selection generated by the beam management unit 415. The determination or selection may be sent to a network entity, such as network entity 405.

Network entity 405 includes processor 430, memory 432, transmitter 434, receiver 436, encoder 437, decoder 438, beam management unit 439, carrier aggregation unit 440, and antennas 234a-t. Processor 430 may be configured to execute instructions stores at memory 432 to perform the operations described herein. In some implementations, processor 430 includes or corresponds to controller/processor 240, and memory 432 includes or corresponds to memory 242. Memory 432 may be configured to store beam information data 406, condition data 408, inter-band CA mode data 442, settings data 444, or a combination thereof, similar to the UE 115 and as further described herein.

Transmitter 434 is configured to transmit data to one or more other devices, and receiver 436 is configured to receive data from one or more other devices. For example, transmitter 434 may transmit data, and receiver 436 may receive data, via a network, such as a wired network, a wireless network, or a combination thereof. For example, network entity 405 may be configured to transmit and/or receive data via a direct device-to-device connection, a local area network (LAN), a wide area network (WAN), a modem-to-modem connection, the Internet, intranet, extranet, cable transmission system, cellular communication network, any combination of the above, or any other communications network now known or later developed within which permits two or more electronic devices to communicate. In some implementations, transmitter 434 and receiver 436 may be replaced with a transceiver. Additionally, or alternatively, transmitter 434, receiver, 436, or both may include or correspond to one or more components of network entity 405 described with reference to FIG. 2.

Encoder 437, and decoder 438 may include the same functionality as described with reference to encoder 413 and decoder 414, respectively. Beam management unit 439 may include similar functionality as described with reference to beam management unit 415. For example, beam management unit 439 may evaluate beam information at the network entity 405 and/or may evaluate beam information received from other wireless communication devices, such as UE 115. Carrier aggregation unit 440 may include similar functionality as described with reference to carrier aggregation unit 416. For example, carrier aggregation unit 440 may select and/or implement a particular inter-band CA mode indicated by a UE. To illustrate, the carrier aggregation unit 440 may determine and/or implement settings, determine and/or use particular beams, or both, based on inter-band CA mode indication information received from the UE.

During operation of wireless communications system 400, network entity 405 may determine that UE 115 has inter-band CA mode determination and/or selection capability. For example, UE 115 may transmit a message 448 that includes an inter-band CA mode determination indicator 490. Indicator 490 may indicate inter-band CA mode determination capability or a particular type or mode of inter-band CA mode determination. In some implementations, network entity 405 sends control information to indicate to UE 115 that inter-band CA mode determination and/or a particular type of inter-band CA mode determination is to be used. For example, in some implementations, message 448 (or another message, such as configuration transmission 450) is transmitted by the network entity 405. The configuration transmission 450 may include or indicate to use inter-band CA mode determination or to adjust or implement a setting of a particular type of inter-band CA mode determination.

During operation, devices of wireless communications system 400, perform UE based inter-band CA mode triggering. Inter-band CA mode determination may occur after or between CSF operations. For example, a network entity (e.g., 405) may transmit a pilot signal 452 to UE 115 and a second network entity (e.g., 405) may transmit a second pilot signal 454 to UE 115. The pilot signals 452, 454 may be sent separately or with a data transmission. The pilot signals 452, 454 may be similar to or the same as a pilot signal used to send (e.g., encode) downlink data from the network entities to the UE 115. In some implementations, the pilot signals 452, 454 are sent with a data transmission, such as a PDSCH. In some such implementations, the pilot signals 452, 454 correspond to a DMRS of a PDSCH. In a particular implementation, the pilot signals 452, 454 are a different type of pilot signal from a second type of pilot signal used in channel feedback, such as a CSI-RS type pilot signal used in CSF operations.

After receiving the pilot signals 452, 454, the UE 115 may generate beam information data 406. For example, the UE 115 may generate beam measurement data based on the pilot signals 452, 454, previous transmissions, previous receptions, or a combination thereof. To illustrate, the UE 115 may generate information which indicates high performing beam(s) for the network entity 405 and the second network entity 105. To illustrate, the UE 115 may estimate channel conditions based on the pilot signals 452, 454. Each network entity 105, 405 may correspond to a particular frequency band (such as a mmWave band).

The UE 115 may also evaluate one or more criterion for using the condition data 408. For example, the UE 115 may optionally determine one or more trigger conditions to evaluate from a set of possible or available trigger conditions based on a current mode, the beam information, trigger condition selection criteria, or a combination thereof. To illustrate, the UE 115 may determine which trigger conditions (e.g., a subset of trigger conditions) to use to evaluate for sending a mode indication message and/or selecting an inter-band CA mode based on a current inter-band CA mode. As a first illustration, the UE 115 may determine to use thermal based trigger conditions if the UE is operating in an intra-module mode. As another illustrate, the UE 115 may determine to use battery power based trigger conditions if the UE is operating in an inter-module mode.

The UE 115 then evaluates the one or more determined or selected trigger conditions, which may be a subset of the trigger conditions. The determined or selected trigger conditions may be evaluated serially, in parallel, or possibly both. For example, the trigger conditions may be applied one after another, e.g., as part of an algorithm, a weighting scheme, a priority, etc. In some such implementations, subsequent trigger conditions may only be evaluated based on a determination of a previous trigger conditions. To illustrate, if a first condition is satisfied (e.g., UE battery power is above 50 percent) then a second, subsequent condition is evaluated, such as a thermal condition. In some such implementations, satisfying the second, subsequent condition (e.g., antenna temperature under 90 degrees) results in a sending a mode indication message indication a second inter-band CA mode. Alternatively, not satisfying the second, subsequent condition (e.g., antenna temperature under 90 degrees) may result in not sending a mode indication message. As another example, not satisfying the second, subsequent condition (e.g., antenna temperature under 90 degrees) may result in a sending a mode indication message indicating a first or current inter-band CA mode. As another example, the trigger conditions may be evaluated independent of one another. Such trigger conditions may be weighted or part of a formula. Each trigger condition may involve one or more thresholds, such as a trigger condition threshold.

The UE 115 generates inter-band CA mode data 442 based on the beam information data 406 and the conditions data 408, such as evaluation of the trigger conditions. The inter-band CA mode data 442 may indicate a particular inter-band CA mode directly or indirectly, such as explicitly or implicitly.

The UE 115 generates an inter-band CA update 456 based on the inter-band CA mode data 442 and transmits the inter-band CA update 456 to one of more of the network entities 105, 405. In a particular implementation, the UE 115 generates an inter-band CA update 456 which indicates a particular inter-band CA mode. Alternatively, the UE 115 does not explicitly identify or determine a inter-band CA mode, i.e., the inter-band CA mode data 442 does not explicitly identify a mode. Rather, the inter-band CA mode data 442 identifies correlated beams and indicates the beams to one of more of the network entities 105, 405. The beams indicate and correspond to a particular inter-band CA mode. To illustrate, if the network entities 105, 405 use the indicated beams, the result will be operation in a particular inter-band CA mode by the UE.

After receiving the inter-band CA update 456, the network entity 405 may implement a particular inter-band CA mode. In some implementations, the network entity 405 determines the particular inter-band CA mode based on the inter-band CA update 456. For example, the network entity 405 determines the particular inter-band CA mode and determines or selects beams and parameters based on the mode. As another example, the network entity 405 determines beams and/or transmission parameters based on the inter-band CA update 456. The network entity 405 employ such beams and/or transmission parameters, which then results in the particular inter-band CA mode indicated, or triggered, by the UE.

As illustrated in the example of FIG. 4, the network entity 405 generates and transmits one or more data channel transmissions 458 to the UE 115 based on the inter-band CA update 456, and/or the UE 115 generates and transmits one or more data channel transmissions 458 to the network entity 405 based on the inter-band CA update 456. To illustrate, the UE 115 uses an intra-module or inter-module inter-band CA mode to send or receive data. In such uplink procedures, the network entity 405 employ such beams and/or transmission parameters to receive the uplink transmissions by the UE 115.

Accordingly, the UE 115 may be able to transmit information to the network entity 405 or entities 105, 405 in such a way as to increase utility of inter-band CA operation and/or take into account parameters of the UE. Thus, a UE can trigger switching of inter-band CA modes more quickly and take advantage of different utility or benefits of different modes.

Accordingly, FIG. 4 describes enhanced determination, selection, and triggering operations for inter-band CA operation. Using UE based inter-band CA mode determination and/or selection may enable improvement when operating in inter-band CA modes. Performing UE based inter-band CA mode determination and/or selection operations enables enhanced UE and network performance.

Figure 5:
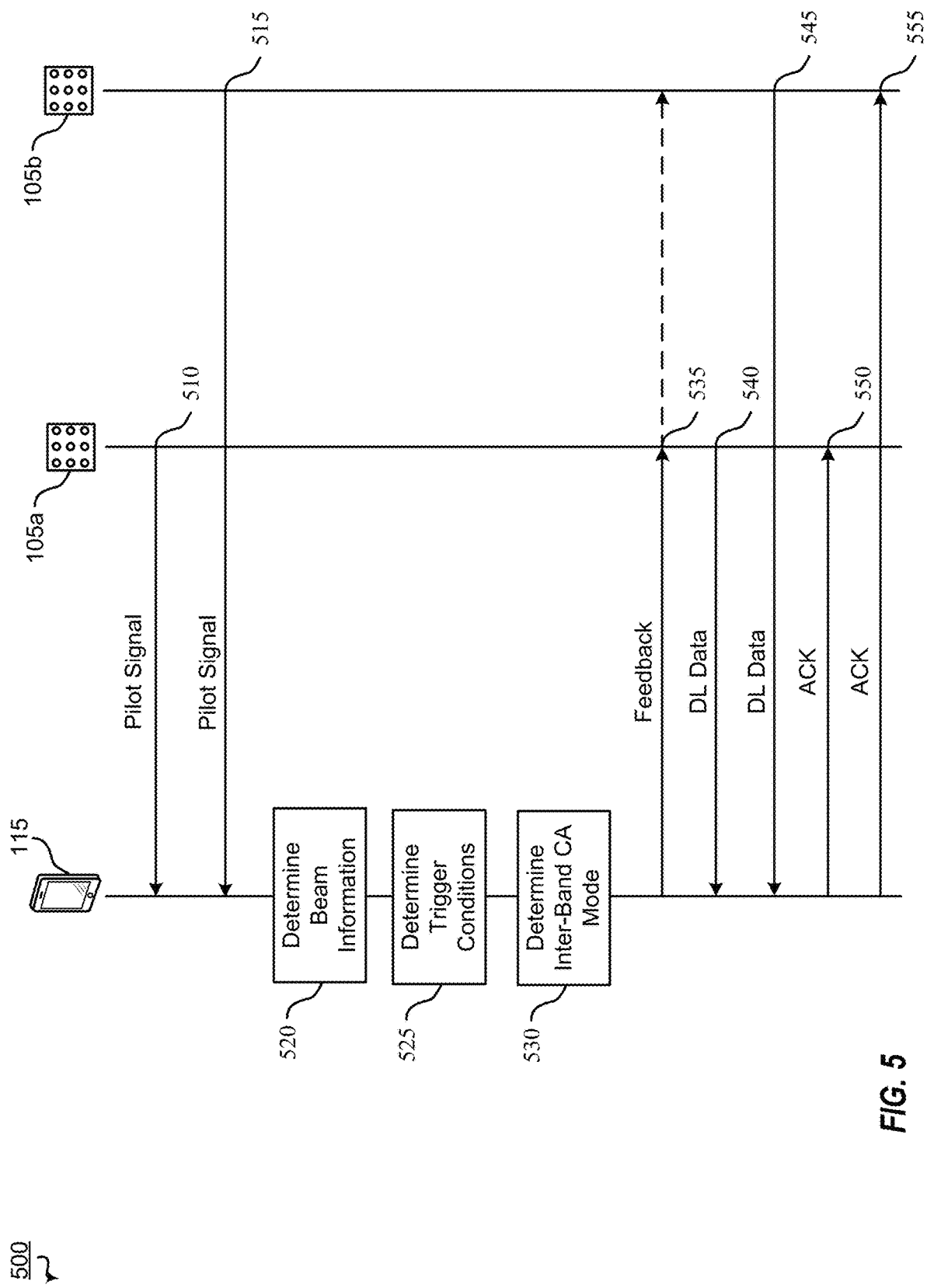
FIG. 5 is a diagram of an example of a ladder diagram of UE based inter-band carrier aggregation mode selection according to some embodiments of the present disclosure.
Figure 6:
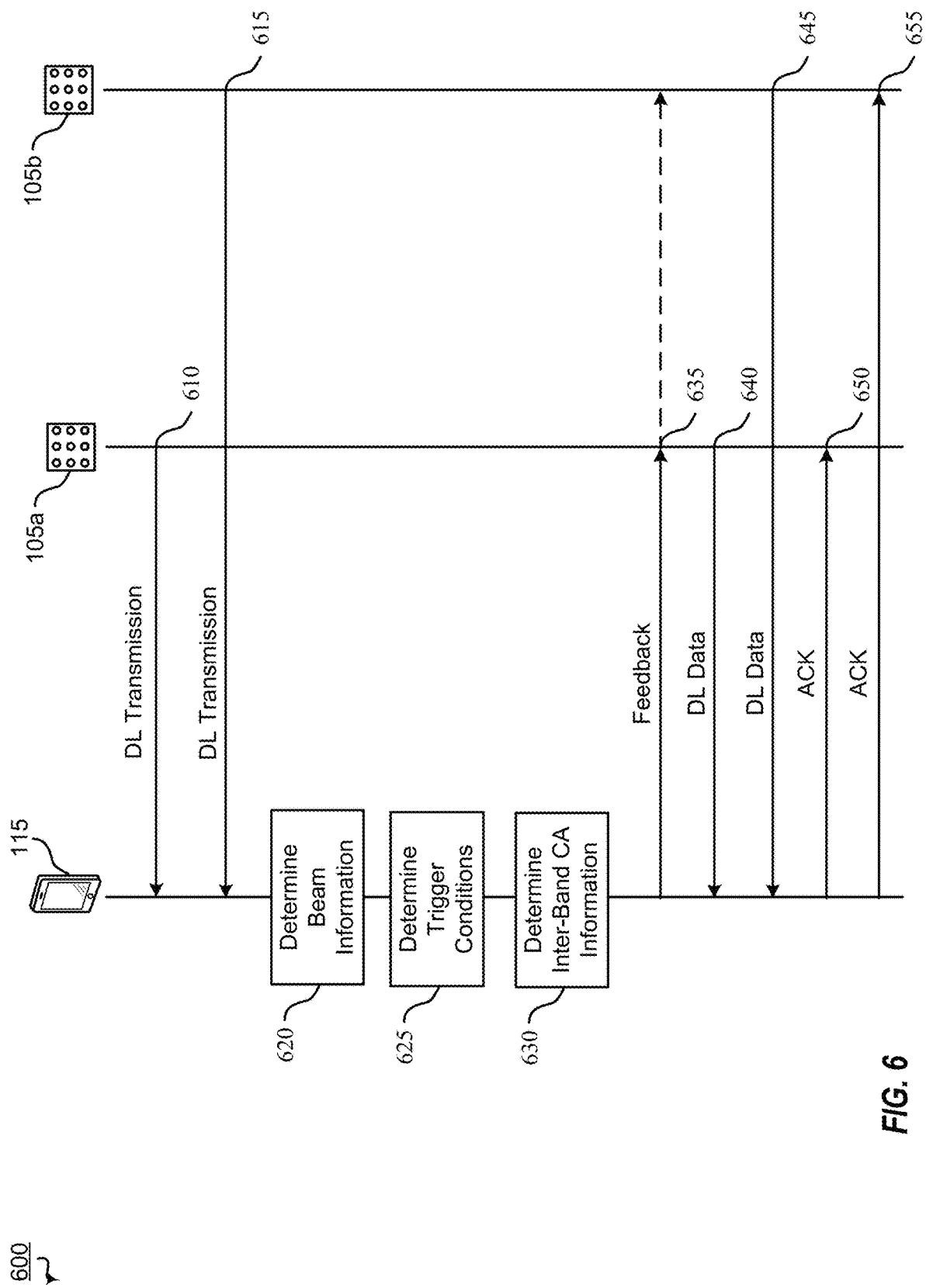
FIG. 6 is a diagram of another example of a ladder diagram of UE based inter-band carrier aggregation mode selection according to some embodiments of the present disclosure.

FIGS. 5 and 6 illustrate example ladder diagrams for UE based inter-band CA mode determination and/or selection operations. Referring to FIG. 5, FIG. 5 is a ladder diagram 500 of an example of explicit indication. Said another way, the inter-band CA mode information sent by a device indicates a particular inter-band CA mode or settings thereof directly.

At 510, a first TRP 105a generates and transmits a first pilot signal. For example, the first TRP 105a sends a CSI-RS pilot signal to be used for estimating channel conditions and providing channel state feedback. The first TRP 105a may generate such a CSI-RS signal periodically, such as every 20 to 80 milliseconds. As another example, the first TRP 105a sends a first SSB burst set (sweeps a plurality of first SSB signals).

At 515, a second TRP 105b generates and transmits a second pilot signal. For example, the second TRP 105b sends a CSI-RS pilot signal to be used for estimating channel conditions and providing channel state feedback. The second TRP 105b may generate such a CSI-RS signal periodically, such as every 20 to 80 milliseconds. As another example, the second TRP 105B sends a second SSB burst set (sweeps a plurality of second SSB signals).

At 520, a UE 115 determines beam information based on the pilot signals. For example, the UE 115 generates beam measurement information and/or beam training information on the pilot signals. To illustrate, the UE 115 generates a CSF based on the pilot signals which includes generating one or more of the RI, the CQI, or the PMI for each pilot signal and corresponding TRP.

In some implementations, determining the beamforming information includes performing beam training operations to determine beam correlation of a steering angle of the beam or a region of the beam in the two or more frequency bands.

In a particular implementation, performing beam training operations includes determining a first beam in a first frequency band meeting a first signal strength condition, determining a second beam in a second frequency band meeting a second signal strength condition, and determining whether the first beam and the second beam are correlated with respect to the steering angle or region of the beam.

At 525, the UE 115 determines one or more trigger conditions. For example, the UE 115 may determine applicable trigger conditions based on a current operating mode. To illustrate, the UE 115 may select triggers conditions of power and thermals to evaluate based on operating in a first inter-band CA mode. The UE 115 may then evaluate the one or more determined trigger conditions.

In some implementations, determining the one or more trigger conditions includes determining the trigger conditions based on a current mode, the beamforming information, and/or trigger condition selection criteria. For example, the UE may select a particular subset of trigger conditions of the trigger conditions based on RSRP, a particular current inter-band CA mode, or both. As an illustrative example, trigger condition selection criteria may indicate to use trigger conditions of battery level and number of antenna modules when the UE 115 is currently operating in the intra-module mode and the RSRP is below a RSRP threshold.

At 530, the UE 115 determines inter-band CA information based on the beam information and the trigger conditions. For example, the UE 115 generates inter-band CA information based on beam information data 406 and conditions data 408. To illustrate, the UE 115 determines a particular inter-band CA mode and generates an indicator which indicates the particular inter-band CA mode directly.

In some implementations, determining the inter-band CA mode includes comparing one or more trigger parameter values to one or more corresponding trigger condition thresholds. For example, the UE may compare a first trigger parameter to a first trigger condition threshold, compare a second trigger parameter to a second trigger condition threshold, etc. The triggers conditions may correspond to any of the trigger conditions described above. As an illustrative example, trigger conditions of low battery level may indicate intra-module and high thermal level may indicate inter-module.

At 535, the UE 115 generates and transmits inter-band CA mode feedback to one or more of the TRPs. For example, the UE 115 transmits an inter-band CA mode update message 456 to the first TRP 105a, the second TRP 105b, or both. To illustrate, the UE 115 transmits an indication (e.g., the indicator), which identifies a particular inter-band CA mode, to the first TRP 105a, the second TRP 105b, or both, in a PUCCH or PUSCH transmission. As another example, the UE 115 transmits information which explicitly indicates an inter-band CA mode in an acknowledgement message, such as an ACK or a NACK, that corresponds to one or more of the downlink (e.g., PDSCH) transmission. To illustrate, the UE 115 may transmit a mode switch message indicating the inter-band CA mode, a beam indication message indicating beams which correspond to the selected inter-band CA mode, or a request for coordination which causes the network to operate such that the UE operates in the inter-band CA mode.

In some implementations, such as when the UE is connected to multiple TRPs, the multiple TRPs have the same cell ID, and the UE is aware of SSB-to-TRP association, transmitting the message indicating the inter-band CA mode may include transmitting, by the UE, a request for layer 1 (L1)-RSRP reports restricted to SSBs from the same TRP of the multiple TRPs. In some other implementations, where the UE is connected to multiple TRPs, the multiple TRPs have the same cell ID, and the UE is aware of SSB-to-TRP association, transmitting the message indicating the inter-band CA mode includes reporting, by the UE, preferred SSBs for CA operation for intra-module or inter-module scenarios to one or more TRP(s) of the multiple TRPs.

In some implementations, where the UE is connected to multiple TRPs, the multiple TRPs have the same cell ID, and the UE is not aware of SSB-to-TRP association, transmitting the message indicating the inter-band CA mode includes transmitting, by the UE, a request for association information indicating SSB-to-TRP mappings from one or more TRPs. The UE may further, responsive to and based on the association information, transmit a report for appropriate SSB candidates for intra-module or inter-module scenarios; or may transmit a request for appropriate SSB candidates for intra-module or inter-module scenarios.

At 540, the first TRP 105*a* generates and transmits a first downlink data transmission based on the inter-band CA feedback. For example, the first TRP 105*a* sends a first PDSCH transmission according to the particular inter-band CA mode indicated by the UE 115.

At 545, second TRP 105*b* generates and transmits a second downlink data transmission based on the inter-band CA feedback. For example, the second TRP 105*b* sends a second PDSCH transmission according to the particular inter-band CA mode indicated by the UE 115.

The downlink data transmissions of 540 and/or 545 are sent via the particular inter-band CA mode indicated by the UE 115. To illustrate, the beams and/or transmission parameters used by the first TRP 105*a*, the second TRP 105*b*, or both, result in the UE 115 receiving the second downlink data transmissions via the particular inter-band CA mode indicated by the UE 115. The particular inter-band CA mode used by the UE 115 to receive the downlink data transmissions may be different from a particular inter-band CA mode used to receive the pilot signals and/or downlink transmissions of 510 and 515. Although the downlink transmissions of 510, 515, 540, and 545 are illustrated on separate lines/timing, such transmissions may be at least partially concurrent, such as simultaneous transmissions.

At 550, the UE 115 generates and transmits an acknowledgment responsive to the second downlink data, and at 555, the UE 115 generates and transmits an acknowledgment responsive to the second downlink data.

Thus, in the example in FIG. 5, the UE and network entities may employ explicit signaling or triggering of inter-band CA modes. That is, the UE indicates the mode inter-band CA directly to the network and the network may then determine the beams and/or transmission parameters based on the indicated mode.

Referring to FIG. 6, FIG. 6 is a ladder diagram 600 of an example of implicit indication. Said another way, the inter-band CA mode information sent by a device indicates a particular inter-band CA mode or settings thereof indirectly.

At 610, a first TRP 105*a* generates and transmits a downlink transmission. For example, the first TRP 105*a* sends PDSCH transmission. As another example, the first TRP 105*a* may send a PDCCH transmission.

At 615, a second TRP 105*b* generates and transmits a downlink transmission. For example, the second TRP 105*b* sends PDSCH transmission. As another example, the second TRP 105*b* may send a PDCCH transmission.

At 620, a UE 115 determines beam information based on the first and second downlink transmissions. For example, the UE 115 determines high performing beam based on reception of the downlink transmissions. To illustrate, the UE 115 determines beam information based on DMRS signals of PDSCHs. The beam information may include or correspond to the beam information as described with reference to 520 of FIG. 5.

At 625, the UE 115 determines trigger conditions, such as described with reference to 525 of FIG. 5. The trigger conditions and trigger information may include or correspond to the trigger conditions and trigger information as described with reference to FIGS. 4 and 5.

At 630, the UE 115 determines inter-band CA information based on the beam information and trigger conditions. For example, the UE 115 generates inter-band CA information based on beam information data 406 and conditions data 408. To illustrate, the UE 115 determines a particular inter-band CA mode and generates information which indicates the particular inter-band CA mode indirectly. Such information may include transmission parameters and/or beam selection information. Use of these transmission parameters and/or beams may result in the particular inter-band CA mode or enhancement of the particular inter-band CA mode. As another illustration, the UE 115 does not determines a particular inter-band CA mode and determines the above information which may indicate the particular inter-band CA mode indirectly, At 635, the UE 115 transmits inter-band CA mode feedback to one or more of the TRPs. For example, the UE 115 transmits an inter-band CA mode update message 456 to the first TRP 105*a*, the second TRP 105*b*, or both. To illustrate, the UE 115 transmits a request for TRP coordination or beam selection information to the first TRP 105*a*, the second TRP 105*b*, or both, in a PUCCH or PUSCH transmission. As another example, the UE 115 transmits information which implicitly indicates an inter-band CA mode in an acknowledgement message, such as an ACK or a NACK, that corresponds to one or more of the downlink (e.g., PDSCH) transmissions.

At 640, the first TRP 105*a* generates and transmits a second downlink transmission based on the inter-band CA feedback. For example, the first TRP 105*a* sends a PDSCH transmission. As another example, the first TRP 105*a* may send a PDCCH transmission.

At 645, second TRP 105*b* generates and transmits a second downlink transmission based on the inter-band CA feedback. For example, the second TRP 105*b* sends a second PDSCH transmission. As another example, the second TRP 105*b* may send a second PDCCH transmission.

The second downlink transmissions of 640 and/or 645 are sent via the particular inter-band CA mode indicated by the UE 115. To illustrate, the beams and/or transmission parameters used by the first TRP 105*a*, the second TRP 105*b*, or both, result in the UE 115 receiving the second downlink transmissions via the particular inter-band CA mode indicated by the UE 115. The particular inter-band CA mode used by the UE 115 to receive the second downlink transmissions may be different from a particular inter-band CA mode used to receive the first downlink transmissions. Although the downlink transmissions of 610, 615, 640, and 645 are illustrated on separate lines/timing, such transmissions may be at least partially concurrent, such as simultaneous transmissions.

At 650, the UE 115 generates and transmits an acknowledgment responsive to the second downlink data, and at 655, the UE 115 generates and transmits an acknowledgment responsive to the second downlink data.

As compared to the example in FIG. 5, which uses explicit indication/signaling of inter-band CA mode, the example of FIG. 6 employs implicit indication/signaling of inter-band CA mode. That is, the UE transmits information which would lead the network entities to use beam or settings that would result in a particular inter-band CA mode at the UE. Particular devices may be set to operate in one type of indication mode depending on hardware capabilities and/or network configuration. Additionally, some devices may switch between the indication modes (e.g., implicit signaling of inter-band CA modes to explicit signaling of inter-band CA modes) of FIGS. 4, 5, and/or 6 based on one or more conditions or received transmissions, such as by RRC message, DCI transmissions, the configuration transmission 450 of FIG. 4, etc.

Additionally, or alternatively, one or more operations of FIGS. 4, 5, and/or 6 may be added, removed, substituted in other implementations. For example, the downlink transmissions, such as control or data transmissions, of FIG. 6 may be used in place of or in addition to the pilot signal transmissions of FIG. 5.

In some implementations, the UE 115 already knows of SSB to TRP mappings. In other implementations, the UE 115 is unaware of SSB to TRP mappings. In some such implementations, the UE 115 transmits a request for SSB to TRP mappings.

In the implementations, shown in FIGS. 4-6, the devices may be further configured to perform handover procedures. For example, when the UE is connected to a single gNB the UE and network may perform a handover of the UE across gNBs based on L3 signaling (e.g., RRC signaling), as is conventionally done. As another example, the UE and network may perform a handover of the UE across gNBs based on L1 signaling, L2 signaling, or both. To illustrate, the UE may switch from a first gNB to a second gNB based on L1 signaling, L2 signaling, or both, and independent of L3 signaling. In some such implementations, the L1 signaling includes DCI transmissions, UCI transmissions, PUCCH transmissions, or a combination thereof. Additionally, or alternatively, the L2 signaling includes MAC-CE transmissions. When performed independent of L3 signaling, the handover may be performed independent of RRC signaling.

In addition to handover procedures, the devices may be further configured to perform TRP and/or gNB add operations. For example, when the UE is connected to a single gNB, the UE may add a second gNB based on L3 signaling. As another example, when the UE is connected to a single gNB, the UE may add a second gNB based on L1 signaling, L2 signaling, or both. To illustrate, the UE may add the second gNB based on L1 signaling, L2 signaling, or both, and may add the second gNB independent of L3 signaling.

Figures 7, 8:
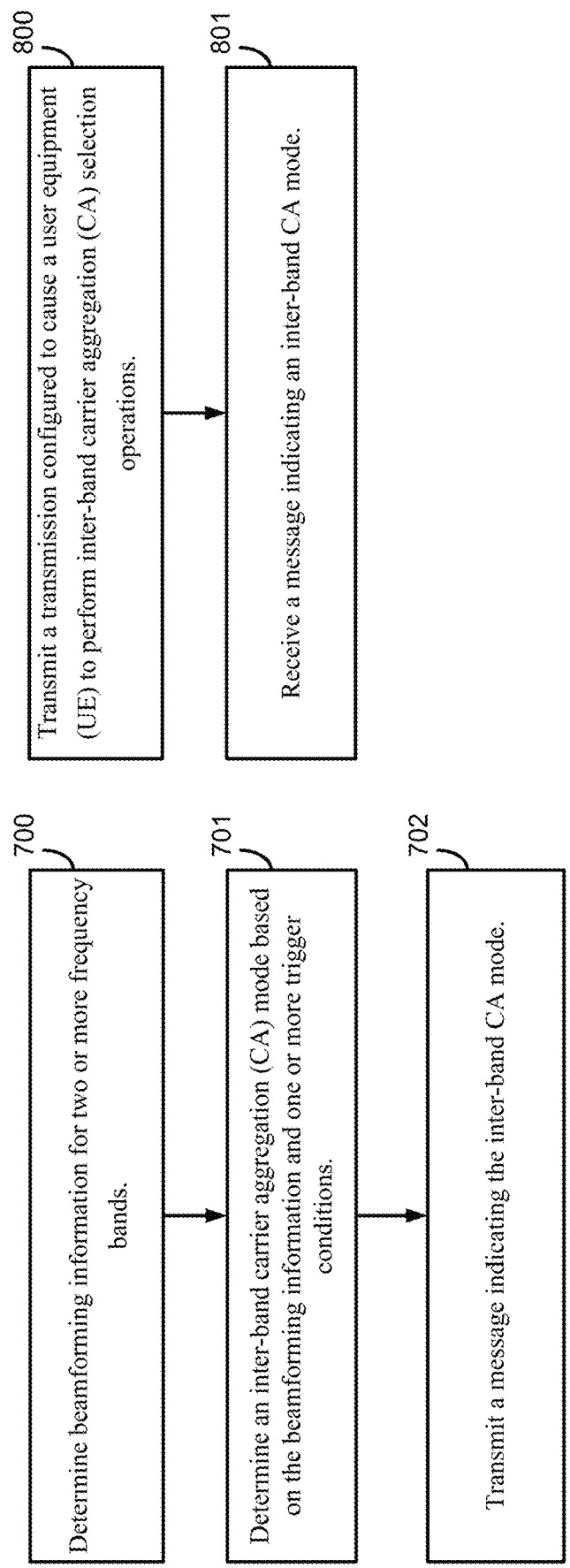
FIG. 7 is a flow diagram illustrating example blocks executed by a UE configured according to some embodiments of the present disclosure.
FIG. 8 is a flow diagram illustrating example blocks executed by a base station configured according to some embodiments of the present disclosure.
Figure 9:
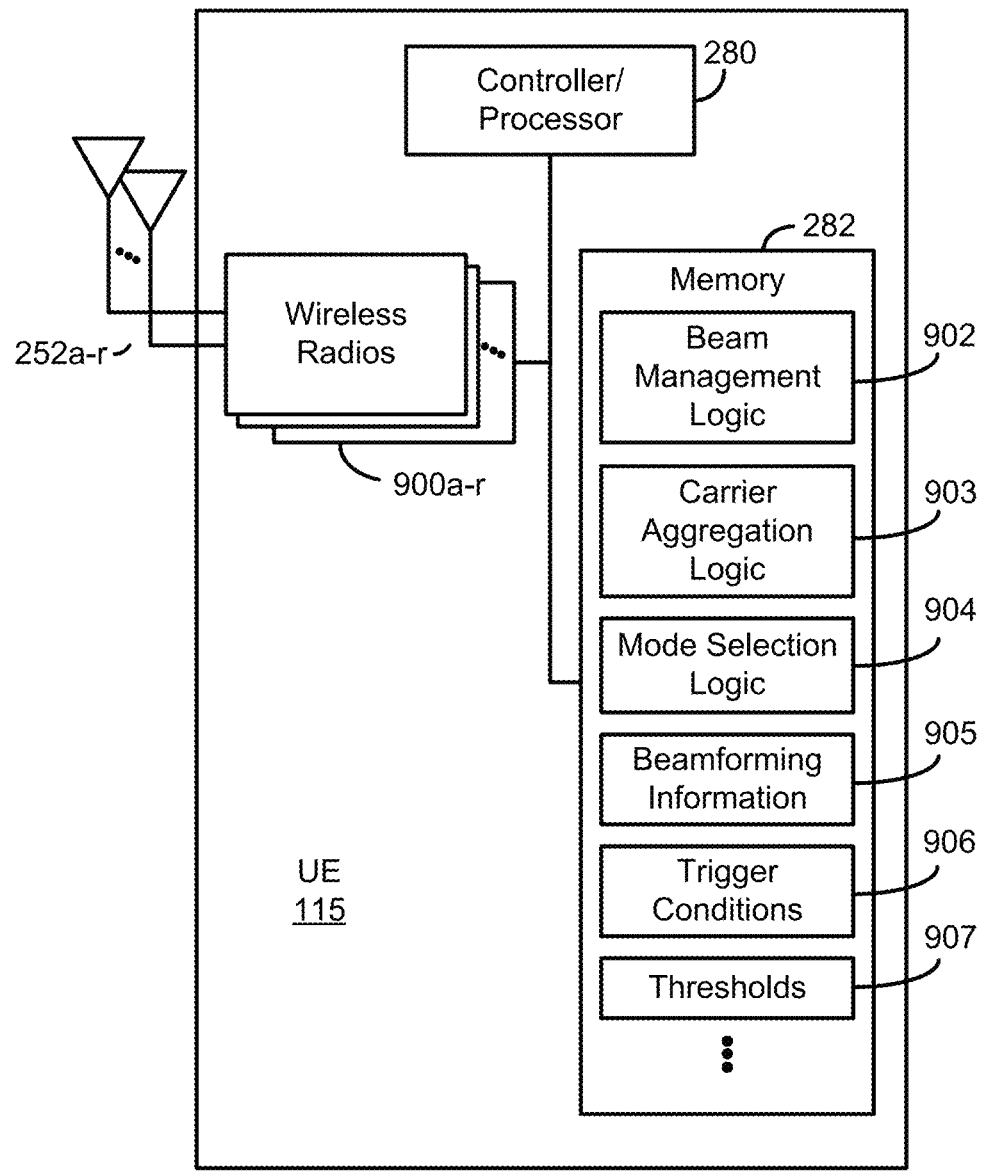
FIG. 9 is a block diagram conceptually illustrating a design of a UE configured to perform precoding information update operations according to some embodiments of the present disclosure.

FIG. 7 is a flow diagram illustrating example blocks executed by a UE configured according to an aspect of the present disclosure. The example blocks will also be described with respect to UE 115 as illustrated in FIG. 9. FIG. 9 is a block diagram illustrating UE 115 configured according to one aspect of the present disclosure. UE 115 includes the structure, hardware, and components as illustrated for UE 115 of FIG. 2. For example, UE 115 includes controller/processor 280, which operates to execute logic or computer instructions stored in memory 282, as well as controlling the components of UE 115 that provide the features and functionality of UE 115. UE 115, under control of controller/processor 280, transmits and receives signals via wireless radios 900*a-r* and antennas 252*a-r*. Wireless radios 900*a-r* includes various components and hardware, as illustrated in FIG. 2 for UE 115, including modulator/demodulators 254*a-r*, MIMO detector 256, receive processor 258, transmit processor 264, and TX MIMO processor 266. As illustrated in the example of FIG. 9, memory 282 stores beam management logic 902, carrier aggregation logic 903, mode selection logic 904, beamforming information data 905, conditions data 906 (e.g., trigger conditions data), and thresholds data 907.

At block 700, a wireless communication device, such as a UE, determines beamforming information for two or more frequency bands. For example, the UE 115 receives pilot signals or reference signals and determines beamforming information based on the pilots signals or reference signals, as described with reference to FIGS. 4-6.

At block 701, the UE 115 determines an inter-band carrier aggregation (CA) mode based on the beamforming information and one or more conditions. For example, the UE 115 determines a beam or beams which meet a signal strength condition or conditions for multiple frequency bands based on the beamforming information and then determines an inter-band CA mode based on the determined beams and one or more trigger conditions, as described with reference to FIGS. 4-6. The trigger conditions may include a UE capability, a band/channel supported, a UE condition, a channel condition, or a combination thereof, and the UE 115 may compare such trigger conditions to corresponding thresholds.

At block 702, the UE 115 transmits a message indicating the inter-band CA mode. For example, the UE 115 transmits a mode switch message indicating the inter-band CA mode, transmits a beam indication message indicating beams which correspond to the inter-band CA mode, or transmits a request for coordination which causes the network to operate such that the UE operates in the inter-band CA mode, as described with reference to FIGS. 4-6.

The UE 115 may execute additional blocks (or the UE 115 may be configured further perform additional operations) in other implementations. For example, the UE 115 may perform one or more operations described above. As another example, the UE 115 may perform one or more of the operations of the aspects described below.

In a first aspect, the UE 115 may further receive, prior to transmitting the message, a data transmission via a first inter-band CA mode, and the UE 115 may receive a second data transmission responsive to the message via a second inter-band CA mode.

In a second aspect, alone or in combination with one or more of the above aspects, the message corresponds to a beam indication and indicates one or more beams for uplink, downlink, or both. The message is also indicated for at least one frequency band of the two or more frequency bands, and the one or more beams correspond to an intra-module inter-band CA mode or an inter-module inter-band CA mode.

In a third aspect, alone or in combination with one or more of the above aspects, the message corresponds to a request for coordination across two or more TRPs for transmission parameters, and the transmission parameters may include precoding matrices, rank, CQI, or a combination thereof.

In a fourth aspect, alone or in combination with one or more of the above aspects, the two or more TRPs correspond to a single gNB.

In a fifth aspect, alone or in combination with one or more of the above aspects, the two or more TRPs correspond to a plurality of gNBs.

In a sixth aspect, alone or in combination with one or more of the above aspects, the message indicates a request to switch the inter-band CA mode. The switch is either a switch from an intra-module inter-band CA mode to an inter-module inter-band CA mode, or a switch from the inter-module inter-band CA mode to the intra-module inter-band CA mode.

In a seventh aspect, alone or in combination with one or more of the above aspects, the intra-module inter-band CA corresponds to transmitting data, receiving data, or both, via multiple layers across different bands with the same multi-band antenna module at the same time, and the inter-module inter-band CA corresponds to transmitting data, receiving data, or both, via multiple layers across different multi-band antenna modules at the same time.

In an eighth aspect, alone or in combination with one or more of the above aspects determining the beamforming information includes: performing beam training operations to determine beam correlation of the steering angle or region of the beam in the two or more frequency bands.

In a ninth aspect, alone or in combination with one or more of the above aspects, performing beam training operations includes: determining a first beam in a first frequency band meeting a first signal strength condition; determining a second beam in a second frequency band meeting a second signal strength condition; and determining whether the first beam and the second beam are correlated with respect to the steering angle or region of the beam. In a particular implementation, the first and second frequency bands may be separated by a frequency threshold. As an illustrative implementation, the threshold may be low enough to enable bands of the same range, such as FR1 or FR2. As another illustration, the threshold may be large enough to ensure that the bands are of different frequency ranges, such as one band each from any of FR1, FR2, and/or FR2X/4.

In a tenth aspect, alone or in combination with one or more of the above aspects, determining the inter-band CA mode is further based on a data rate or reliability related operating modes of the UE. The reliability related operating modes may include or correspond to a high reliability operating mode, a standard reliability operating mode, or a low reliability operating mode. As illustrative non-limiting examples, a high reliability operating mode may be have a target or condition of a block error rate (BLER) of less than or equal to $10^{-4}$ and low a reliability operating mode may have a target or condition of a block error rate of less than or equal to (or greater than) $10^{-2}$.

In an eleventh aspect, alone or in combination with one or more of the above aspects, determining the inter-band CA mode includes: comparing a first trigger parameter to a first condition threshold.

In a twelfth aspect, alone or in combination with one or more of the above aspects, determining the inter-band CA mode further includes: comparing a second parameter to a second condition threshold. In a particular implementation, the conditions are associated with different frequency bands.

In a thirteenth aspect, alone or in combination with one or more of the above aspects, the one or more conditions include or correspond to a UE capability, a band or channel supported, a UE condition, a channel condition, or a combination thereof.

In a fourteenth aspect, alone or in combination with one or more of the above aspects, the UE capability includes a number of antenna modules, a location of the antenna modules, a type of the antenna modules, or a combination thereof.

In a fifteenth aspect, alone or in combination with one or more of the above aspects, the type of the antenna modules includes or corresponds to a type of antenna element, a size of the antenna modules (e.g., an array shape/size), or a combination thereof.

In a sixteenth aspect, alone or in combination with one or more of the above aspects, the UE condition includes a power level, a thermal level, data rate requirements, reliability requirements, self-blocking conditions, UE orientation, other blockage conditions (such as external environment and UE mobility caused blockages), or a combination thereof. The reliability requirements may correspond to direct indicators of reliability such as error rates (e.g., BLER) or average latency, or indirect indicators of reliability, such as SNR.

In a seventeenth aspect, alone or in combination with one or more of the above aspects, the channel condition includes or corresponds to a number of TRPs needed for supporting inter-band CA.

In an eighteenth aspect, alone or in combination with one or more of the above aspects, the UE is connected to multiple TRPs, the multiple TRPs have the same cell ID, and the UE is aware of SSB-to-TRP association. In such aspects, transmitting the message indicating the inter-band CA mode includes: transmitting, by the UE, a request for L1-RSRP reports restricted to SSBs from the same TRP of the multiple TRPs.

In a nineteenth aspect, alone or in combination with one or more of the above aspects, the UE is connected to multiple TRPs, the multiple TRPs have the same cell ID, and the UE is aware of SSB-to-TRP association. In such aspects, transmitting the message indicating the inter-band CA mode includes: reporting, by the UE, preferred SSBs for CA operation for intra-module or inter-module scenarios to one or more TRP(s) of the multiple TRPs.

In a twentieth aspect, alone or in combination with one or more of the above aspects, the UE is connected to multiple TRPs, the multiple TRPs have the same cell ID, and the UE is not aware of SSB-to-TRP association. In such aspects, transmitting the message indicating the inter-band CA mode includes the UE 115 transmitting a request for association information indicating SSB-to-TRP mappings from one or more TRPs, and the UE 115 may further, responsive to and based on the association information: transmitting, by the UE, a report for appropriate SSB candidates for intra-module or inter-module scenarios; or transmitting, by the UE, a request for appropriate SSB candidates for intra-module or inter-module scenarios.

In a twenty-first aspect, alone or in combination with one or more of the above aspects, the UE is connected to a single gNB and performs a handover operations of the UE across gNBs based on L3 signaling.

In a twenty-second aspect, alone or in combination with one or more of the above aspects, the UE 115 performs a handover based on L1 signaling, L2 signaling, or both.

In a twenty-third aspect, alone or in combination with one or more of the above aspects, the UE 115 switches from a first gNB to a second gNB based on L1 signaling, L2 signaling, or both.

In a twenty-fourth aspect, alone or in combination with one or more of the above aspects, the L1 signaling includes DCI transmissions, UCI transmissions, PUCCH transmissions, or a combination thereof.

In a twenty-fifth aspect, alone or in combination with one or more of the above aspects, the L2 signaling includes MAC-CE transmissions.

In a twenty-sixth aspect, alone or in combination with one or more of the above aspects, the UE 115 performs a handover independent of L3 signaling, such as RRC signaling.

In a twenty-seventh aspect, alone or in combination with one or more of the above aspects, the UE 115 is connected to a single gNB, and the UE 115 adds a second gNB based on L1 signaling, L2 signaling, or both.

In a twenty-eighth aspect, alone or in combination with one or more of the above aspects, the UE 115 determines a second inter-band CA mode based on second beamforming information and one or more second conditions. The UE 115 may refrain from transmitting a message indicating the second inter-band CA mode, wherein the second inter-band CA mode is the same as the inter-band CA mode.

In a twenty-ninth aspect, alone or in combination with one or more of the above aspects, the UE is configured to operate in one or more sub-6 GHz bands, one or more mmWave bands, or a combination thereof. The UE 115 may also be configured to operate in one or more advanced frequency ranges. As illustrative, non-limiting examples, the devices may be configured to operate in one or more of the following bands, such as n41, n77, n78 and n79 for sub-6 GHz bands and any of n257-n261 for mmWave bands. Additionally, or alternatively, 60 GHz bands may be used. Such bands may be jurisdiction specific and may vary from jurisdiction to jurisdiction.

In a thirtieth aspect, alone or in combination with one or more of the above aspects, prior to determining the beamforming information, the UE 115 transmits a capability message indicating that the UE is configured for inter-band CA switching signaling.

In a thirty-first aspect, alone or in combination with one or more of the above aspects, prior to determining the beamforming information, the UE 115 transmits a capability message indicating that the UE is an inter-band CA switching signaling capable UE.

In a thirty-second aspect, alone or in combination with one or more of the above aspects, prior to determining the beamforming information, the UE 115 receives a configuration message from a networking entity indicating an inter-band CA switching signaling mode.

Accordingly, a UE and a base station may perform UE based inter-band carrier aggregation mode selection operations. By UE based inter-band carrier aggregation mode selection, throughput and reliability may be increased.

Figure 10:
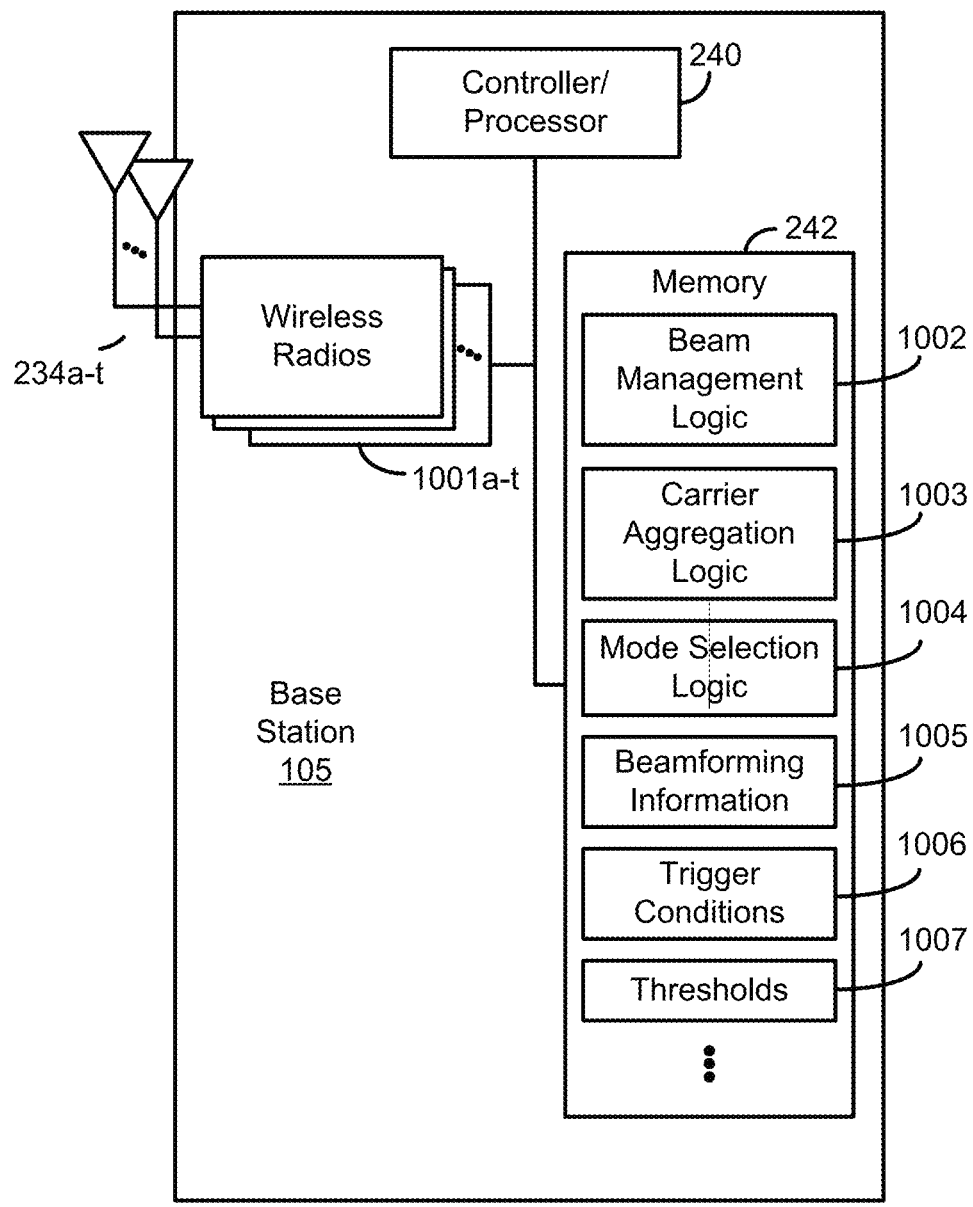
FIG. 10 is a block diagram conceptually illustrating a design of a base station configured to perform precoding information update operations according to some embodiments of the present disclosure.

FIG. 8 is a flow diagram illustrating example blocks executed by wireless communication device configured according to another aspect of the present disclosure. The example blocks will also be described with respect to base station 105 (e.g., gNB) as illustrated in FIG. 10. FIG. 10 is a block diagram illustrating base station 105 configured according to one aspect of the present disclosure. Base station 105 includes the structure, hardware, and components as illustrated for base station 105 of FIG. 2. For example, base station 105 includes controller/processor 240, which operates to execute logic or computer instructions stored in memory 242, as well as controlling the components of base station 105 that provide the features and functionality of base station 105. Base station 105, under control of controller/processor 240, transmits and receives signals via wireless radios 1001a-t and antennas 234a-t. Wireless radios 1001a-t includes various components and hardware, as illustrated in FIG. 2 for base station 105, including modulator/demodulators 232a-t, MIMO detector 236, receive processor 238, transmit processor 220, and TX MIMO processor 230. As illustrated in the example of FIG. 10, memory 242 stores beam management logic 1002, carrier aggregation logic 1003, mode selection logic 1004, beamforming information data 1005, conditions data 1006 (e.g., trigger conditions data), and thresholds data 1007. One of more of 1002-1007 may include or correspond to one of 902-907.

At block 800, a wireless communication device, such as a base station, transmits a transmission configured to cause a user equipment (UE) to perform inter-band carrier aggregation (CA) selection operations. For example, the base station 105 transmits a first pilot signal or reference signal, as described with reference to FIGS. 4-6.

At block 801, the base station 105 receives a message indicating an inter-band CA mode. For example, the base station 105 receives a mode switch message indicating the inter-band CA mode, receives a beam indication message indicating beams which correspond to the inter-band CA mode, or receives a request for coordination which causes the network (e.g., multiple TRPs and/or base stations) to operate such that the UE operates in the inter-band CA mode, as described with reference to FIGS. 4-6.

The base station 105 may execute additional blocks (or the base station 105 may be configured further perform additional operations) in other implementations. For example, the base station 105 may perform one or more operations described above. As another example, the base station 105 may perform one or more of the operations of the aspects described below.

In a first aspect, the base station 105 may further, prior to transmitting the message, transmit a data transmission via a first inter-band CA mode, and may transmit a second data transmission responsive to the message via a second inter-band CA mode.

In a second aspect, alone or in combination with one or more of the above aspects, the message corresponds to a beam indication and indicates one or more beams for uplink, downlink, or both. The message is also indicated for at least one frequency band of the two or more frequency bands, and the one or more beams correspond to an intra-module inter-band CA mode or an inter-module inter-band CA mode.

In a third aspect, alone or in combination with one or more of the above aspects, message corresponds to a request for coordination across two or more TRPs for transmission parameters, and the transmission parameters may include precoding matrices, rank, CQI, or a combination thereof.

In a fourth aspect, alone or in combination with one or more of the above aspects, the two or more TRPs correspond to a single gNB.

In a fifth aspect, alone or in combination with one or more of the above aspects, the two or more TRPs correspond to a plurality of gNBs.

In a sixth aspect, alone or in combination with one or more of the above aspects, the network device includes at least one gNB of the plurality of gNBs.

In a seventh aspect, alone or in combination with one or more of the above aspects, the message indicates a request to switch the inter-band CA mode. The switch is either a switch from an intra-module inter-band CA mode to an inter-module inter-band CA mode, or a switch from the inter-module inter-band CA mode to the intra-module inter-band CA mode.

In an eighth aspect, alone or in combination with one or more of the above aspects, the intra-module inter-band CA corresponds to transmitting data, receiving data, or both, via multiple layers across different bands with the same multi-band antenna module at the same time, and the inter-module inter-band CA corresponds to transmitting data, receiving data, or both, via multiple layers across different multi-band antenna modules at the same time.

In a ninth aspect, alone or in combination with one or more of the above aspects, the base station 105 may further determine to perform a handover operations for the UE, and to transmit, to a second network device, a second transmission indicating to take over a communication link with the UE.

In a tenth aspect, alone or in combination with one or more of the above aspects, the handover is performed based on L1 signaling, L2 signaling, or both.

In an eleventh aspect, alone or in combination with one or more of the above aspects, the L1 signaling includes DCI transmissions, UCI transmissions, PUCCH transmissions, or a combination thereof.

In a twelfth aspect, alone or in combination with one or more of the above aspects, the L2 signaling includes MAC-CE transmissions.

In a thirteenth aspect, alone or in combination with one or more of the above aspects, the handover is further performed independent of L3 signaling, such as RRC signaling.

In a fourteenth aspect, alone or in combination with one or more of the above aspects, the base station 105 may further determine to add a second network device for communicating with the UE, and transmit, to the second network device, a second transmission indicating to establish a communication link with the UE.

In a fifteenth aspect, alone or in combination with one or more of the above aspects, the network device determines to add the second network device based on L1 signaling, L2 signaling, or both.

In a sixteenth aspect, alone or in combination with one or more of the above aspects, the network device determines to add the second network device independent of L3 signaling, such as RRC signaling.

In a seventeenth aspect, alone or in combination with one or more of the above aspects, the transmission corresponds to a request for coordination across two or more TRPs for transmission parameters, and the base station 105 transmits, to a second network device, a second transmission indicating the transmission parameters for the UE.

In an eighteenth aspect, alone or in combination with one or more of the above aspects, prior to transmitting the transmission, the base station 105 receives a capability message indicating that the UE is configured for inter-band CA switching signaling.

In a nineteenth aspect, alone or in combination with one or more of the above aspects, prior to transmitting the transmission, the base station 105 receives a capability message indicating that the UE is an inter-band CA switching signaling capable UE.

In a twentieth aspect, alone or in combination with one or more of the above aspects, prior to transmitting the transmission, the base station 105 transmits a configuration message indicating an inter-band CA switching signaling mode.

Accordingly, a UE and a base station may perform UE based inter-band carrier aggregation mode selection operations. By performing UE based inter-band carrier aggregation mode selection operations, throughput and reliability may be increased.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The functional blocks and modules described herein (e.g., the functional blocks and modules in FIG. 2) may comprise processors, electronics devices, hardware devices, electronics components, logical circuits, memories, software codes, firmware codes, etc., or any combination thereof. In addition, features discussed herein relating to UE based inter-band carrier aggregation mode selection may be implemented via specialized processor circuitry, via executable instructions, and/or combinations thereof.

Those of skill would further appreciate that the various illustrative logical blocks, modules, circuits, and algorithm steps (e.g., the logical blocks in FIGS. 7 and 8) described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Skilled artisans will also readily recognize that the order or combination of components, methods, or interactions that are described herein are merely examples and that the components, methods, or interactions of the various aspects of the present disclosure may be combined or performed in ways other than those illustrated and described herein.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. Computer-readable storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, a connection may be properly termed a computer-readable medium. For example, if the software is transmitted from a website, server, or other remote source using a coaxial cable, fiber optic cable, twisted pair, or digital subscriber line (DSL), then the coaxial cable, fiber optic cable, twisted pair, or DSL, are included in the definition of medium. Disk and disc, as used herein, includes compact disc (CD), laser disc, optical disc, digital versatile disc (DVD), hard disk, solid state disk, and blu-ray disc where disks usually reproduce data magnetically, while discs reproduce data optically with lasers. Combinations of the above should also be included within the scope of computer-readable media.

As used herein, including in the claims, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C) or any of these in any combination thereof.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method of wireless communication comprising:
   determining, by a user equipment (UE), beamforming information for two or more frequency bands;
   determining, by the UE, an inter-band carrier aggregation (CA) mode based on the beamforming information and one or more conditions; and
   transmitting, by the UE, a message indicating the inter-band CA mode, wherein the message indicates a request to switch the inter-band CA mode.

2. The method of claim 1, wherein the message indicates to switch from a first inter-band CA mode to a second inter-band CA mode, and further comprising:
   receiving, by the UE prior to transmitting the message, a data transmission via the first inter-band CA mode; and
   receiving, by the UE, a second data transmission responsive to the message via the second inter-band CA mode, the second inter-band CA mode different from the first inter-band CA mode.

3. The method of claim 1, wherein the message corresponds to a beam indication and indicates one or more beams for uplink, one or more beams for downlink, or one or more beams for uplink and downlink, wherein the message is indicated for at least one frequency band of the two or more frequency bands, and wherein the one or more beams correspond to an intra-module inter-band CA mode or an inter-module inter-band CA mode.

4. The method of claim 1, wherein the message corresponds to a request for coordination across two or more Transmission Reception Points (TRPs) for transmission parameters, wherein the transmission parameters include precoding matrices, a rank, a Channel Quality Indicator (CQI), or a combination thereof.

5. The method of claim 4, wherein the two or more TRPs correspond to a single base station or to different base stations of a plurality of base stations.

6. The method of claim 1, wherein an intra-module inter-band CA mode corresponds to transmitting data, receiving data, or transmitting and receiving data, via multiple layers across different bands with the same multi-band antenna module at the same time, wherein an inter-module inter-band CA mode corresponds to transmitting data, receiving data, or transmitting and receiving data, via multiple layers across different multi-band antenna modules at the same time, and wherein the switch is:
   a switch from the intra-module inter-band CA mode to the inter-module inter-band CA mode; or
   a switch from the inter-module inter-band CA mode to the intra-module inter-band CA mode.

7. The method of claim 1, wherein determining the beamforming information includes:
   performing beam training operations to determine beam correlation of a steering angle or region of the beam in the two or more frequency bands.

8. The method of claim 7, wherein performing beam training operations includes:
   determining a first beam in a first frequency band meeting a first signal strength condition;
   determining a second beam in a second frequency band meeting a second signal strength condition; and
   determining whether the first beam and the second beam are correlated with respect to the steering angle or region of the beam.

9. The method of claim 1, wherein determining the inter-band CA mode is further based on a data rate or reliability related operating modes of the UE.

10. An apparatus configured for wireless communication, the apparatus comprising:

at least one processor; and
a memory coupled to the processor, the processor is configured to:
determine beamforming information for two or more frequency bands;
determine an inter-band carrier aggregation (CA) mode based on the beamforming information and one or more conditions; and
transmit a message indicating the inter-band CA mode, wherein the message indicates a request to switch the inter-band CA mode.

11. The apparatus of claim 10, wherein the apparatus is configured to operate in a sub-6 GHz band, operate in a millimeter wave (mmWave) band, or operate in the sub-6 GHz band and the mmWave band, and wherein to determine the inter-band CA mode includes:
to compare a first parameter to a first condition threshold; and
to compare a second parameter to a second condition threshold.

12. The apparatus of claim 10, wherein the one or more conditions include or correspond to a user equipment (UE) capability, a band or channel supported, a UE condition, a channel condition, or a combination thereof.

13. The apparatus of claim 12, wherein the one or more conditions include the UE capability, wherein the UE capability includes a number of antenna modules, a location of the antenna modules, a type of the antenna modules, or a combination thereof, and wherein the type of the antenna modules includes or corresponds to a type of antenna element, a size of the antenna modules, or a combination thereof.

14. The apparatus of claim 12, wherein the one or more conditions include the UE condition, and wherein the UE condition includes a power level, a thermal level, data rate requirements, reliability requirements, self-blocking conditions, a UE orientation, other blockage conditions, or a combination thereof.

15. The apparatus of claim 12, wherein the one or more conditions include the channel condition, and wherein the channel condition includes or corresponds to a number of Transmission Reception Points (TRPs) needed for supporting inter-band CA.

16. The apparatus of claim 10, wherein the apparatus is connected to multiple Transmission Reception Points (TRPs), wherein the multiple TRPs have the same cell ID, wherein the apparatus is aware of Synchronization Signal Blocks (SSB)-to-TRP association, and wherein to transmit the message indicating the inter-band CA mode includes:
to transmit a request for layer 1 Reference Signal Receive Power (L1-RSRP) reports restricted to SSBs from the same TRP of the multiple TRPs.

17. The apparatus of claim 10, wherein the apparatus is connected to multiple Transmission Reception Points (TRPs), wherein the multiple TRPs have the same cell ID, wherein the apparatus is aware of Synchronization Signal Blocks (SSB)-to-TRP association, and wherein to transmit the message indicating the inter-band CA mode includes:
to report preferred SSBs for CA operation for intra-module or inter-module scenarios to one or more TRP(s) of the multiple TRPs.

18. The apparatus of claim 10, wherein the apparatus is connected to multiple Transmission Reception Points (TRPs), wherein the multiple TRPs have the same cell ID, wherein the apparatus is not aware of Synchronization Signal Blocks (SSB)-to-TRP association, and wherein transmitting the message indicating the inter-band CA mode includes transmitting a request for association information indicating SSB-to-TRP mappings from one or more TRPs, and wherein the processor is further configured to, responsive to and based on the association information:
transmit a report for appropriate SSB candidates for intra-module or inter-module scenarios; or
transmit a request for appropriate SSB candidates for intra-module or inter-module scenarios.

19. The apparatus of claim 10, further comprising:
determining a second inter-band CA mode based on second beamforming information and one or more second conditions; and
refraining from transmitting a message indicating the second inter-band CA mode, wherein the second inter-band CA mode is the same as the inter-band CA mode.

20. The apparatus of claim 10, wherein the processor is further configured to:
receive pilot signal information, wherein the beamforming information is determined based on the pilot signal information.

21. A method of wireless communication comprising:
transmitting, by a network device, a transmission configured to cause a user equipment (UE) to perform inter-band carrier aggregation (CA) mode selection operations;
transmitting, by the network device, pilot signal information to the UE for the inter-band CA mode selection operations; and
receiving, by the network device, a message indicating an inter-band CA mode responsive to the transmission and the pilot signal information, wherein the message indicates a request to switch the inter-band CA mode.

22. The method of claim 21, wherein the message indicates to switch from a first inter-band CA mode to a second inter-band CA mode, and further comprising:
transmitting, by the network device prior to transmitting the message, a data transmission via the first inter-band CA mode; and
transmitting, by the network device, a second data transmission responsive to the message via the second inter-band CA mode, the second inter-band CA mode different from the first inter-band CA mode.

23. The method of claim 21, further comprising:
determining, by the network device, to perform handover operations for the UE; and
transmitting, by the network device to a second network device, a second transmission indicating to take over a communication link with the UE, wherein the handover operations are performed based on layer 1 (L1) signaling, layer 2 (L2) signaling, or L1 and L2 signaling.

24. The method of claim 23, wherein the L1 signaling includes downlink control information (DCI) transmissions, uplink control information (UCI) transmissions, Physical Uplink Control Channel (PUCCH) transmissions, or a combination thereof, wherein the L2 signaling includes Medium Access Control-Control Element (MAC-CE) transmissions, and wherein the handover operations are further performed independent of layer 3 (L3) signaling.

25. An apparatus configured for wireless communication, the apparatus comprising:
at least one processor; and
a memory coupled to the processor, the processor is configured to:
transmit a transmission configured to cause a user equipment (UE) to perform inter-band carrier aggregation (CA) mode selection operations;

transmit pilot signal information to the UE for the inter-band CA mode selection operations; and receive a message indicating an inter-band CA mode responsive to the transmission and the pilot signal information, wherein the message indicates a request to switch the inter-band CA mode.

26. The apparatus of claim 25, wherein the processor is further configured to:

determine to add a second network device for communicating with the UE, wherein the network device determines to add the second network device based on (layer 1) L1 signaling, layer 2 (L2) signaling, or L1 and L2 signaling; and transmit, to the second network device, a second transmission indicating that the second network device establish a communication link with the UE.

27. The apparatus of claim 25, wherein the transmission corresponds to a request for coordination across two or more Transmission Reception Points (TRPs) for transmission parameters, and wherein the processor is further configured to:

transmit, to a second network device, a second transmission indicating the transmission parameters for the UE.

28. The apparatus of claim 25, wherein the transmission includes the pilot signal information.

29. The apparatus of claim 25, wherein the pilot signal information includes or corresponds to a demodulation reference signal (DMRS), a channel state information reference signal (CSI-RS), or a synchronization signal block (SSB), and wherein the receipt of the message indicating the inter-band CA mode is based on the transmission of the pilot signal information.

30. The apparatus of claim 25, wherein the pilot signal information is configured to cause the UE to generate beamforming information for the performance of the inter-band CA mode selection operations.

* * * * *